(12) United States Patent
Okamoto et al.

(10) Patent No.: US 11,015,948 B2
(45) Date of Patent: May 25, 2021

(54) INFORMATION PROVISION DEVICE, INFORMATION PROVISION SERVER, AND INFORMATION PROVISION METHOD

(71) Applicant: Mitsubishi Electric Corporation, Tokyo (JP)

(72) Inventors: Shogo Okamoto, Tokyo (JP); Takuji Morimoto, Tokyo (JP); Kimika Ikegami, Tokyo (JP); Shin Miura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 77 days.

(21) Appl. No.: 16/068,613

(22) PCT Filed: Feb. 17, 2016

(86) PCT No.: PCT/JP2016/054577
§ 371 (c)(1),
(2) Date: Jul. 6, 2018

(87) PCT Pub. No.: WO2017/141376
PCT Pub. Date: Aug. 24, 2017

(65) Prior Publication Data
US 2019/0017840 A1    Jan. 17, 2019

(51) Int. Cl.
*G01C 21/36* (2006.01)
*G08G 1/0968* (2006.01)

(52) U.S. Cl.
CPC ..... *G01C 21/3655* (2013.01); *G01C 21/3629* (2013.01); *G08G 1/096844* (2013.01); *G08G 1/096855* (2013.01)

(58) Field of Classification Search
None
See application file for complete search history.

(56) References Cited

U.S. PATENT DOCUMENTS 8,700,299 B2 * 4/2014 Morita ............. G08G 1/096716
                                              701/123
8,855,912 B2 * 10/2014 Miura ................ G01C 21/3469
                                              701/400

(Continued)

FOREIGN PATENT DOCUMENTS

JP          2989740 B2    12/1999
JP          2014-524380 A  9/2014

*Primary Examiner* — Yuen Wong
*Assistant Examiner* — Hongye Liang
(74) *Attorney, Agent, or Firm* — Birch, Stewart, Kolasch & Birch, LLP

(57) ABSTRACT

Provided are a first route condition acquirer to acquire a route condition of a planned travel route of a moving body, the route including a plurality of sections; a recommended operation definer to define a content of recommended operation information related to a device included in the moving body and an output point in the planned travel route at which the recommended operation information is output; a complexity level determiner to determine a complexity level of a route in one of the sections including the defined output point by using a static route condition out of the route condition of the planned travel route and, when the complexity level of the section is greater than or equal to a threshold value, determining a complexity level of each of the other sections in the planned travel route; and a recommended operation determiner to determine the output point using the determination result.

7 Claims, 15 Drawing Sheets

(56) References Cited

U.S. PATENT DOCUMENTS

2014/0236423 A1 8/2014 Alexander et al.
2016/0347327 A1* 12/2016 Kondo .................. B60W 50/14

* cited by examiner

FIG. 2

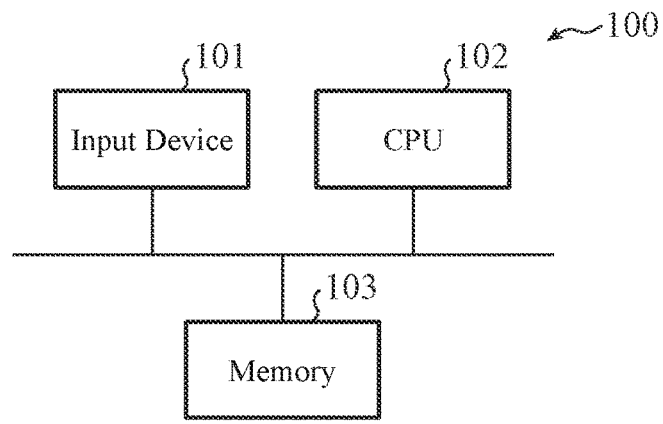

FIG. 3A

| Output Point | Output Likelihood for Recommended Operation Content of "Set a Destination" | Output Likelihood for Recommended Operation Content of "Enlarge a Map" | Output Likelihood for Recommended Operation Content of "..." |
|---|---|---|---|
| Within 300 m from Home | 90 | 30 | ... |
| From 300 m to 1 km from Home | 50 | 70 | ... |
| ⋮ | ⋮ | ⋮ | ... |

FIG. 3B

| Output Point | Output Likelihood for Recommended Operation Content of "Set a Destination" | Output Likelihood for Recommended Operation Content of "Enlarge a Map" | Output Likelihood for Recommended Operation Content of "..." |
|---|---|---|---|
| Within 300 m from Home | 85 | 30 | ... |
| From 300 m to 1 km from Home | 55 | 70 | ... |
| ⋮ | ⋮ | ⋮ | ... |

FIG. 4

| Number of Route Conditions | Parameter Value | Complexity Level |
|---|---|---|
| 1 | 0~1 | 1 |
| | 2~3 | 2 |
| | 3~5 | 3 |
| 2 | 0~2 | 1 |
| | 3~5 | 2 |
| | 6~10 | 3 |
| 3 | 0~3 | 1 |
| | 4~7 | 2 |
| | 7~12 | 3 |
| ⋮ | ⋮ | ⋮ |

FIG. 11A

```
1. Set a Convenience Store
   as a Destination

2. Switch to Radio

3. Enlarge
```

FIG. 11B

```
1. Switch to Radio

2. Reduce Volume
```

FIG. 13

| Number of Route Conditions | Parameter Value | Difficulty Level |
|---|---|---|
| 1 | 0~1 | 1 |
| | 2~3 | 2 |
| | 3~5 | 3 |
| 2 | 0~2 | 1 |
| | 3~5 | 2 |
| | 6~10 | 3 |
| 3 | 0~3 | 1 |
| | 4~7 | 2 |
| | 7~12 | 3 |
| ⋮ | ⋮ | ⋮ |
| | ⋮ | ⋮ |
| | ⋮ | ⋮ |

INFORMATION PROVISION DEVICE, INFORMATION PROVISION SERVER, AND INFORMATION PROVISION METHOD

TECHNICAL FIELD

The present invention relates to a technology for providing information for supporting operation of a device included in a moving body.

BACKGROUND ART

In the related art, a technology for presenting operation recommended for a device included in a moving body is used. According to a method described in Patent Literature 1, when operations that may be performed are proposed, an operation is selected from among the proposed operations depending on a condition in which an automobile is being used. Specifically, in the case where the condition in which the automobile is being used corresponds to an event that serves as a trigger related to one of the proposed operations, the operation is selected, and the selected operation is presented.

CITATION LIST

Patent Literatures

Patent Literature 1: JP 2014-524380 A

SUMMARY OF INVENTION

Technical Problem

According to the above Patent Literature 1, an operation is selected and presented depending on the condition in which the automobile is being used from among the plurality of proposed operations, but the timing of presenting the selected operation is not considered. Therefore, there is a problem in that the timing of presenting the selected operation may not be preferable for an operator.

The present invention has been made in order to solve the above problem, and it is an object of the present invention to change the timing of presenting information of recommended operation in the case where the timing of presenting the information of the recommended operation is not preferable in consideration of the condition of a travel route of a moving body.

Solution to Problem

An information provision device according to the present includes: a first route condition acquirer to acquire a route condition of a planned travel route of a moving body, the planned travel route including a plurality of sections; a recommended operation definer to define a content of recommended operation information related to a device included in the moving body and an output point in the planned travel route at which the recommended operation information is output; a complexity level determiner to determine a complexity level of a route in one of the sections including the output point defined by the recommended operation definer by using a static condition of the route from among the route conditions of the planned travel route acquired by the first route condition acquirer and, in a case where the complexity level of the section is greater than or equal to a threshold value, determine a complexity level of each of the other sections in the planned travel route; and a recommended operation determiner to determine the output point using the determination result of the complexity level determiner.

Advantageous Effects of Invention

According to the present invention, it is possible to avoid presentation of information at timing unpreferable for presenting recommended operation information.

BRIEF DESCRIPTION OF DRAWINGS

FIG. 2 is a diagram illustrating an exemplary hardware configuration of the information provision device according to the first embodiment.

FIGS. 3A and 3B are diagrams illustrating examples of a database referred to by a recommended information defining unit of the information provision device according to the first embodiment.

FIG. 4 is a diagram illustrating an example of a table defined in advance in the information provision device according to the first embodiment.

FIGS. 11A and 11B are diagrams illustrating examples of display screens displayed on the basis of recommended operation information provided by the information provision device according to the second embodiment.

FIG. 13 is a diagram illustrating an example of a table defined in advance in the information provision device according to the third embodiment.

DESCRIPTION OF EMBODIMENTS

To describe the present invention further in detail, embodiments for carrying out the present invention will be described below with reference to the accompanying drawings. In the following first to seventh embodiments, descriptions are given with an exemplary case where a vehicle such as an automobile is used as a moving body; however, a train, an aircraft, a ship, or the like can be used other than vehicles.

Figure 1:
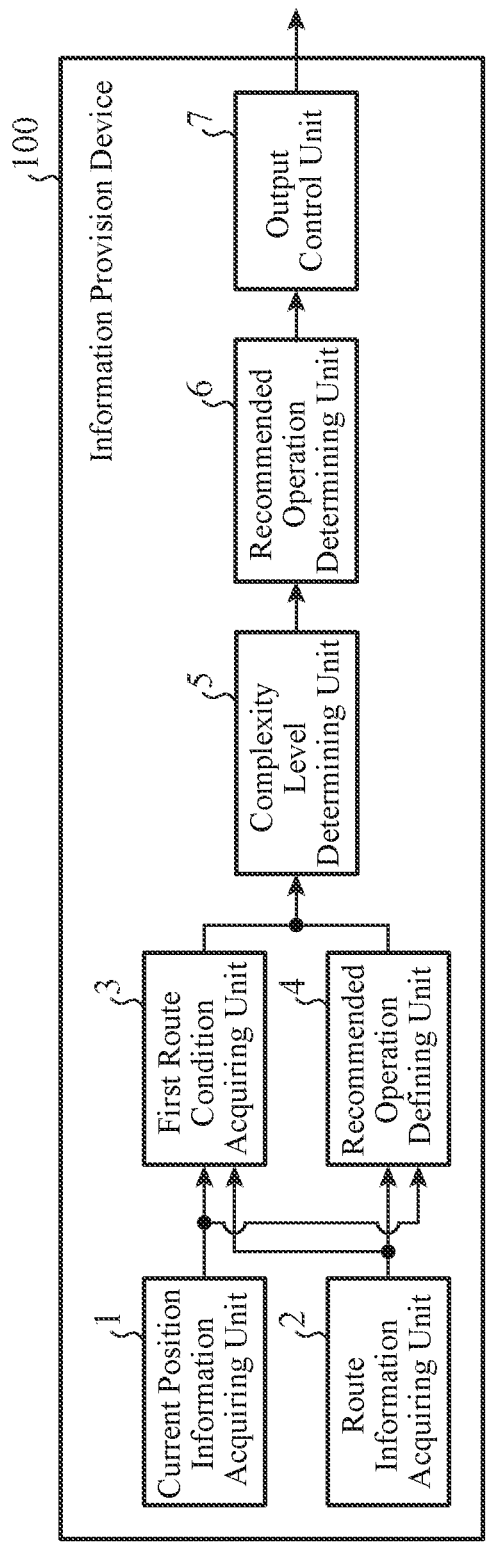
FIG. 1 is a block diagrams illustrating a configuration of an information provision device according to a first embodiment.

FIG. 1 is a block diagram illustrating a configuration of an information provision device 100 according to a first embodiment of the present invention. The information provision device 100 includes a current position information acquiring unit 1, a route information acquiring unit 2, a first route condition acquiring unit 3, a recommended operation defining unit 4, a complexity level determining unit 5, a recommended operation determining unit 6, and an output control unit 7.

The current position information acquiring unit 1 acquires information indicating a latitude and a longitude of the current position of a vehicle from, for example, a global positioning system (GPS) receiver (not illustrated) mounted on the vehicle. The route information acquiring unit 2 acquires route information set to, for example, a navigation system or the like mounted to the vehicle. As the route information, the route information acquiring unit 2 acquires, for example, information as to whether a destination is set, information indicating a route to the destination, information indicating a distance to the destination, information indicating a latitude and a longitude of the destination, or other information. The route information acquiring unit 2 acquires, as information as to whether a destination is set, "1" in the case where a destination is set or "0" in the case where no destination is set, for example. As information indicating a distance to the destination, the route information acquiring unit 2 further acquires, for example, "1200 m" as a distance from the current position of the vehicle to the destination. The current position information acquiring unit 1 and the route information acquiring unit 2 may acquire each piece of information at a preset timing from the device mounted in the vehicle or may constantly acquire each piece of information.

The first route condition acquiring unit 3 acquires information predicting the condition of a route set to an area beyond a range within a predetermined distance from the current position of the vehicle (hereinafter referred to as a planned travel route). Specifically, the first route condition acquiring unit 3 sets a plurality of sections obtained by dividing the planned travel route from a point exceeding the range within the predetermined distance from the current position of the vehicle and acquires information predicting the route condition of the planned travel route for each of the plurality of set sections. For example, in the case where the moving body is a vehicle, the first route condition acquiring unit 3 acquires information predicting the route condition of the planned travel route from at least one of information of the onboard device, information acquired by a vehicle-mounted sensor, map data, road traffic information, vehicle information and communication system (VICS) (registered trademark, hereinafter not shown) information, and information obtained by dedicated short range communications (DSRC). Note that map data, road traffic information, and VICS information are acquired from information held by a navigation device or the like mounted in the vehicle or by other means. The information predicting the route condition of the planned travel route acquired by the first route condition acquiring unit 3 is information indicating, for example, the number of lanes, a road type, and the like. Note that details of the information predicting the route condition of the planned travel route will be described later.

The recommended operation defining unit 4 refers to a database (not illustrated) on the basis of the current position information acquired by the current position information acquiring unit 1, the route information acquired by the route information acquiring unit 2, and the information predicting the route condition of the planned travel route acquired by the first route condition acquiring unit 3 and defines the content and an output point of the information indicating an operation recommended for a driver with respect to the onboard device (hereinafter referred to as "recommended operation information") while the vehicle is traveling on the planned travel route. The database referred to by the recommended operation defining unit 4 may be included in the information provision device 100 or may be included in an external device (not illustrated) provided outside the information provision device 100. Specifically as the content of the recommended operation information, the recommended operation defining unit 4 defines navigation-related operations, driving-related operations, operations related to an interior environment of the vehicle, operations related to sound or video devices, operations related to communication devices, or other operations.

The complexity level determining unit 5 determines whether the route condition of the output point of the recommended operation information is complex by using information indicating static route conditions out of the information predicting the route condition of the planned travel route acquired by the first route condition acquiring unit 3. In other words, the complexity level determining unit 5 determines whether it will be complex if the driver executes the operation indicated by the content of the recommended operation information defined by the recommended operation defining unit 4 at the defined output point while the vehicle is traveling on the planned travel route. Thus, the complexity level determining unit 5 indicates the determination result as information indicating the level of complexity of the route condition stepwise such as level 1, level 2, . . . as information indicating whether the route condition is complex (hereinafter referred to as a complexity level). Note that the complexity level determining unit 5 may indicate the complexity level of the route condition by a method other than the method of indicating with a level. The complexity level determining unit 5 determines whether the complexity level is greater than or equal to a preset threshold value. On the basis of the determination result, the complexity level determining unit 5 determines the complexity level of each of the other sections not including the defined output point if necessary.

The recommended operation determining unit 6 determines the output point of the recommended operation information on the basis of the determination result of the complexity level determining unit 5. In the case where it is determined that the output point defined by the complexity level determining unit 5 is not complex, the recommended operation determining unit 6 determines the defined output point as the output point of the recommended operation information. On the other hand, in the case where it is determined that the output point defined by the complexity level determining unit 5 is complex, the recommended operation determining unit 6 determines, as the output point, a section closest to the output point of the recommended operation information defined by the recommended operation defining unit 4 out of the other sections the complexity level of which has been determined to be less than the threshold value. The recommended operation determining unit 6 outputs information including the content defined by the recommended operation defining unit 4 and the output point to the output control unit 7 as recommended operation information.

The output control unit 7 performs control for outputting the recommended operation information output from the recommended operation determining unit 6 to at least one of a display device or an audio output device (not illustrated) provided outside the information provision device 100. The display device is, for example, a display or the like of a navigation device. Furthermore, the audio output device is, for example, a speaker or the like mounted on the vehicle.

Next, an example of a hardware configuration of the information provision device 100 will be described. FIG. 2 is a diagram illustrating an exemplary hardware configuration of the information provision device 100. The current position information acquiring unit 1, the route information acquiring unit 2, and the first route condition acquiring unit 3 in the information provision device 100 are implemented by an input device 101 that receives information from the outside. Each of the recommended operation defining unit 4, the complexity level determining unit 5, the recommended operation determining unit 6, and the output control unit 7 in the information provision device 100 is implemented by a processing circuit. That is, each of the recommended operation defining unit 4, the complexity level determining unit 5, the recommended operation determining unit 6, and the output control unit 7 has a processing circuit that defines a recommended operation information and avoids presentation of operation support information in a complex route condition on the basis of the determination result of the first route condition. The processing circuit corresponds to a central processing unit (CPU) 102 that executes a program stored in a memory 103. The functions of the recommended operation defining unit 4, the complexity level determining unit 5, the recommended operation determining unit 6, and the output control unit 7 are implemented by software, firmware, or a combination of software and firmware. Software or firmware are described as a program and stored in the memory 103. By reading and executing the program stored in the memory 103, the CPU 102 implements the functions of the recommended operation defining unit 4, the complexity level determining unit 5, the recommended operation determining unit 6, and the output control unit 7. That is, each of the recommended operation defining unit 4, the complexity level determining unit 5, the recommended operation determining unit 6, and the output control unit 7 has the memory 103 for storing a program execution of which by the CPU 102 results in execution of steps illustrated in FIGS. 5 and 6, which will be described later. It can also be said that these programs cause the computer to execute procedures or methods of the recommended operation defining unit 4, the complexity level determining unit 5, the recommended operation determining unit 6, and the output control unit 7.

Here, the CPU 102 may include, for example, a central processing unit, a processing unit, an arithmetic unit, a processor, a microprocessor, a microcomputer, a digital signal processor (DSP), or the like. The memory 103 may be a nonvolatile or volatile semiconductor memory such as a random access memory (RAM), a read only memory (ROM), a flash memory, an erasable programmable ROM (EPROM), an electrically EPROM (EEPROM), a magnetic disk such as a hard disk or a flexible disk, or an optical disk such as a mini disc, a compact disc (CD) or a digital versatile disc (DVD).

Next, the first route condition acquiring unit 3, the recommended operation defining unit 4, the complexity level determining unit 5, and the recommended operation determining unit 6 will be described in more detail. First, the first route condition acquiring unit 3 will be described. The first route condition acquiring unit 3 sets a range within a radius of 50 m around the current position of the vehicle as a range within a predetermined distance from the current position of the vehicle, for example. The first route condition acquiring unit 3 divides a planned travel route set in an area that is beyond the range of a radius of 50 m around the current position of the vehicle, for example at each 100 m as one section. Specifically, the first route condition acquiring unit 3 sets a plurality of sections by dividing the planned travel route, in such a manner as a section greater than or equal to 50 m and less than 150 m from the current position of the vehicle, another section greater than or equal to 150 m and less than 250 m.

In the case where "1" indicating that a destination is set is indicated in the route information acquired by the route information acquiring unit 2, the first route condition acquiring unit 3 acquires the condition predicting the route condition of the planned travel route of the plurality of sections with respect to the planned travel route from a point exceeding the range within the predetermined distance from the current position of the vehicle to the set destination. For example, assuming that the first route condition acquiring unit 3 sets a planned travel route in an area beyond the range of a radius of 50 m around the current position of the vehicle, that a distance from the current position of the vehicle to the set destination is 700 m, and that each section extends for 100 m, the first route condition acquiring unit 3 acquires a condition predicting the route condition of the planned travel route for each section such as a section greater than or equal to 50 m and less than 150 m from the current position of the vehicle, a section greater than or equal to 150 m and less than 250 m, . . . a section greater than or equal to 550 m and less than 650 m, and a section greater than or equal to 650 m and less than 700 m.

On the other hand, in the case where "0" indicating that no destination is set is indicated in the route information acquired by the route information acquiring unit 2, the first route condition acquiring unit 3 acquires the condition predicting the route condition of the planned travel route in each section with respect to the planned travel route from a point exceeding the range within a predetermined distance from the current position of the vehicle to a set point. For example, assuming that the first route condition acquiring unit 3 sets a planned travel route in an area beyond the range of a radius of 50 m around the current position of the vehicle, that a distance from the current position of the vehicle to the set point is 1000 m, and that each section extends for 100 m, the first route condition acquiring unit 3 acquires a condition predicting the route condition of the planned travel route for each section such as a section greater than or equal to 50 m and less than 150 m from the current position of the vehicle, a section greater than or equal to 150 m and less than 250 m, . . . a section greater than or equal to 850 m and less than 950 m, and a section greater than or equal to 950 m and less than 1000 m.

Note that, in the setting by the first route condition acquiring unit 3, the range within the predetermined distance around the current position of the vehicle may be set to a range of a radius of 0 m around the current position, and thus substantially no range within a predetermined distance may be set. That is, the first route condition acquiring unit 3 may set the whole route from the current position to the destination as the planned travel route.

The first route condition acquiring unit 3 acquires, as the information predicting the route condition of the planned travel route, information indicating the condition of at least one of the items of the number of lanes, a road type, a form of a road, the width of a road, left/right turning points, intersections, branch points, junctions, points for changing lanes, points of restricted lanes, stop points, traffic light points, railway crossing points, entrance points of a highway or a dedicated road, exit points of a highway or a dedicated road, tollgate points of a highway or a dedicated road, ETC points of a highway or a dedicated road, junction points of a highway or a dedicated road, service area points, parking area points, carpool lane points, entrance or exit points of a facility, congested points, accident points, construction points, detour points, road closing points, no-entry points, disaster points, weather, season, and a time zone.

The first route condition acquiring unit 3 acquires the condition indicated by the information of each of the items described above as a parameter value in which the condition is converted into a numerical value. An exemplary parameter value of each of the items acquired by the first route condition acquiring unit 3 will be described below. For example, with regard to the number of lanes of the planned travel route, the first route condition acquiring unit 3 acquires a parameter value "0" for no center line, a parameter value "1" for one lane on each side, a parameter value "2" for two lanes on each side, and a parameter value "3" for three lanes on each side. Similarly, with regard to a road type of the planned travel route, the first route condition acquiring unit 3 acquires a parameter value "0" for a narrow street, a parameter value "1" for a general road, a parameter value "2" for a prefectural road, a parameter value "3" for a national road, and a parameter value "4" for a highway, for example. Furthermore, the first route condition acquiring unit 3 acquires, with regard to the form of a road of the planned travel route, a parameter value "0" for a normal road, a parameter value "1" for a tunnel, a parameter value "2" for a bridge, and the like, for example. The first route condition acquiring unit 3 further acquires, with regard to the width of a road to be traveled, a parameter value "0" for a width of less than 3.0 m, a parameter value "1" for a width greater than or equal to 3.0 m and less than 5.5 m, a parameter value "2" for a width greater than or equal to 5.5 m, and the like, for example.

The first route condition acquiring unit 3 acquires a parameter value depending on whether there is a left/right turning point, an intersection, a branch point, a junction, a point for changing lanes, a point of a restricted lane, a stop point, a traffic light point, a railway crossing point, an entrance point of a highway or a dedicated road, an exit point of a highway or a dedicated road, a tollgate point of a highway or a dedicated road, an ETC point of a highway or a dedicated road, a junction point of a highway or a dedicated road, a service area point, a parking area point, a carpool lane point, an entrance or exit point of a facility, a congested point, an accident point, a construction point, a detour point, a road closing point, a no-entry point, or a disaster point in the planned travel route. The first route condition acquiring unit 3 acquires a parameter value "0" in the case where the planned travel route is not the aforementioned right/left turning point or the like and a parameter value "1" in the case where the planned travel route is the aforementioned right/left turning point or the like. With regard to the weather, the first route condition acquiring unit 3 acquires a parameter value "0" for clear weather, a parameter value "1" for cloudy weather, a parameter value "2" for the rain, and the like, for example. In addition, the first route condition acquiring unit 3 acquires a parameter value "0" for spring, a parameter value "1" for summer, a parameter value "2" for fall, a parameter value "3" for winter with regard to seasons, for example, and with regard to time zones acquires a parameter value "0" for early morning, a parameter value "1" for morning, a parameter value "2" for the noon, and the like, for example.

Although the case where the first route condition acquiring unit 3 acquires the condition indicated by the acquired information as a parameter value converted into a numerical value, the acquisition is not limited to the form of a parameter value but may be in any form of information that allows for relative comparison of the condition of the planned travel route.

Next, the recommended operation defining unit 4 will be described. First, the content of the recommended operation information of the recommended operation defining unit 4 will be described. As the content of the recommended operation information, the recommended operation defining unit 4 defines navigation-related operations, driving-related operations, operations related to an interior environment of the vehicle, operations related to sound or video devices, operations related to communication devices, or other operations. Navigation-related operations include an operation of at least one of the items of, for example, map display, setting of a waypoint or a destination, route search/re-search/guidance setting, searching for surrounding facilities/points, acquisition of road traffic information, and acquisition of weather information. Driving-related operations include an operation of at least one of the items of an accelerator, a brake, a steering wheel, shift gears, an indicator, a hazard lump, passing, a headlight, and other lightings. Operations related to an interior environment of the vehicle include an operation of at least one of the items of the temperature, the humidity, the air volume, ventilation, air conditioning, window opening and closing in the interior of the vehicle. Operations related to audio or video devices include an operation of at least one of the items of music selection, channel selection, content selection, playback, stop, and volume/sound quality/image adjustment. Operations related to communication devices include an operation of at least one of the items of outgoing call, re-calling, talking, a hold, blocking, hands-free, and web search.

When the content of operations defined by the recommended operation defining unit 4 is specifically described, for example in the case where navigation-related operations are defined, operations such as enlargement of the scale in a map display and setting a parking lot around a destination as a waypoint in waypoint setting are defined. Furthermore, in the case where the recommended operation defining unit 4 defines, for example, operations related to an audio or video device, operations such as playing a CD and turning off audio are defined.

Next, an output point of the recommended operation information defined by the recommended operation defining unit 4 will be described. The recommended operation defining unit 4 defines an output point of the recommended operation information on the basis of the current position information, the route information, the content of the recommended operation information, and the information predicting the condition of the planned driving road. For example in the case where the vehicle starts traveling without setting a destination, the recommended operation defining unit 4 defines a point 100 m after the start of the traveling as an output point at which the content of the recommended operation information of "set an AB amusement park as the destination" is output. Moreover, for example in the case where the vehicle is traveling with a destination having been set, the recommended operation defining unit 4 defines a point 2 km before the destination as an output point at which the content of the recommended operation information of "set a parking lot around the destination as a waypoint" is output. Furthermore, for example in the case where the vehicle is traveling on a highway, the recommended operation defining unit 4 defines a point 3 km before a service area as an output point at which the content of the recommended operation information of "display information of the next service area" is output. In addition, for example in the case where the vehicle is immediately after getting off a highway, the recommended operation defining unit 4 defines a point 300 m from a tollgate as an output point at which the content of the recommended operation information of "set a michi-no-eki as a waypoint" is output.

The content of the aforementioned recommended operation information is determined by the recommended operation defining unit 4 with reference to the past operation history, the database, and the like. Here, the past operation history, the database, and the like may be obtained by accumulating information of a host vehicle or by accumulating information of other vehicles collected in a server, and the like, in addition to the information of the host vehicle. FIGS. 3A and 3B are diagrams illustrating examples of the database referred to by the recommended operation defining unit 4 of the information provision device 100 according to the first embodiment. The database illustrated in FIGS. 3A and 3B includes output points and output likelihoods of each piece of recommended operation content, and exemplary output likelihoods of the two pieces of recommended operation content of "set a destination" and "enlarge a map" are illustrated. The output likelihood is represented by a number from 0 to 100, for example. FIG. 3A illustrates a database in the case where output likelihoods are preset. The recommended operation defining unit 4 refers to the database of FIG. 3A and defines, for example, high-order N pieces of recommended output content in terms of output likelihood at each output point as the recommended operation content at that point.

Alternatively, the database may change the output likelihood depending on the past operation history. FIG. 3B illustrates the database illustrated in FIG. 3A in which the output likelihood is changed depending on the past operation history. For example in the past operation history, in the case where the frequency of performing "set a destination" is higher "farther than or at 300 m and within 1 km from home" than "within 300 m from home", the output likelihood for the recommended operation content of "set a destination" in the case where the output point is "within 300 m from home" decreases from "90" to "85". On the other hand, the output likelihood for the recommended operation content of "set a destination" in the case where the output point is "farther than or at 300 m and within 1 km from home" increases from "50" to "55". The recommended operation defining unit 4 refers to the database of FIG. 3B and defines, for example, high-order N pieces of recommended output content in terms of output likelihood at each output point as the recommended operation content at that point.

In addition, the recommended operation defining unit 4 may read information described in, for example, a comma-separated values (CSV) format file from the outside of the information provision device 100 and define the read information as the content and an output point of recommended operation information.

Next, the complexity level determining unit 5 and the recommended operation determining unit 6 will be described. The complexity level determining unit 5 obtains the complexity level of a section including an output point on the basis of the number of parameters and parameter values of parameters indicated by information indicating static route conditions in the section including the output point of the recommended operation information defined by the recommended operation defining unit 4 out of the information predicting the route condition of the planned travel route acquired by the first route condition acquiring unit 3. The aforementioned static route conditions refer to conditions of a route which do not substantially change with the lapse of time. For example, conditions such as the number of lanes, a road type, a form of a road, the width of a road, left/right turning points, intersections, branch points, junctions, and the like are included. On the basis of the number of parameters and parameter values of the parameters of the information indicating the static route conditions, the complexity level determining unit 5 represents whether the route condition of the section including the output point of the defined recommended operation information is complex in terms of a complexity level. The complexity level determining unit 5 sets a higher complexity level as a parameter value of each of the parameters is larger.

The complexity level determining unit 5 determines whether the obtained complexity level is greater than or equal to a preset threshold value. In the case where the complexity level is less than the threshold value, the complexity level determining unit 5 outputs information indicating the content and the output point of the recommended operation information defined by the recommended operation defining unit 4 to the output control unit 7. On the other hand, in the case where the complexity level is larger than or equal to the threshold value, the complexity level determining unit 5 obtains complexity levels of other sections not including the output point of the recommended operation information defined by the recommended operation defining unit 4. The complexity level determining unit 5 determines whether complexity levels of the other sections are greater than or equal to the preset threshold value. The complexity level determining unit 5 outputs the content and the output point of the recommended operation information defined by the recommended operation defining unit 4 and the determination result.

The recommended operation determining unit 6 refers to the determination result input from the complexity level determining unit 5 and determines the output point defined by the recommended operation defining unit 4 as an output point of the recommended operation information on the basis of the determination result that the complexity level at the output point of the recommended operation information defined by the recommended operation defining unit 4 is less than the threshold value. The recommended operation determining unit 6 further refers to the determination result input from the complexity level determining unit 5 and determines, as an output point, a section closest to the output point among sections in which complexity levels at the output point of the recommended operation information are less than the threshold value on the basis of the determination result that the complexity level at the output point of the recommended operation information defined by the recommended operation defining unit 4 is greater than or equal to the threshold value and that complexity levels of other sections not including the output point are less than the threshold value.

The aforementioned complexity level setting will be described in detail. The complexity level determining unit 5 obtains complexity levels by referring to a table defined in advance as illustrated in FIG. 4, for example. In the table illustrated in FIG. 4, "the number of route conditions" is the number of pieces of information acquired as static route conditions of the section including the output point of the recommended operation information. For example, "1" is given in the case where information of only the number of lanes in the section is acquired, and "3" is given in the case where information of the number of lanes, a road type, and a right/left turning point in the section is acquired. A "parameter value" in the table represents the sum of parameter values of information indicating acquired static route conditions in the section. A "complexity level" in the table represents a value of a complexity level to be set corresponding to the sum of parameter values. A complexity level "1" indicates a route condition in which the vehicle can travel smoothly. Examples include route conditions in which traveling is assumed to be smooth such as a suburban prefectural road with a few traffic lights and a national road with two lanes on each side. A complexity level "2" indicates a route condition requiring the checking of the surroundings more than usual. Examples include route conditions that require driving at a relatively slower speed than usual such as a railroad crossing and a tollgate. A complexity level "3" indicates a route condition requiring the checking of the surroundings more than usual. Examples include at the time of turning right/left at an intersection and a merging point on a highway. For example, in a case where the number of parameters of the information indicating the static route conditions of the section including the output point of the recommended operation information defined by the recommended operation defining unit 4 is "3", and the sum of parameter values of the parameters is "5", the complexity level determining unit 5 sets a complexity level of "2".

One of the complexity levels of "1", "2", and "3", for example, illustrated in the table is set as a preset set value used for determination by the complexity level determining unit 5. For example, in the case where a set value "2" is set in the complexity level determining unit 5 and a complexity level of the section including the output point of the recommended operation information defined by the recommended operation defining unit 4 is greater than or equal to "2", the complexity level determining unit 5 determines that the section is complex.

Figure 5:
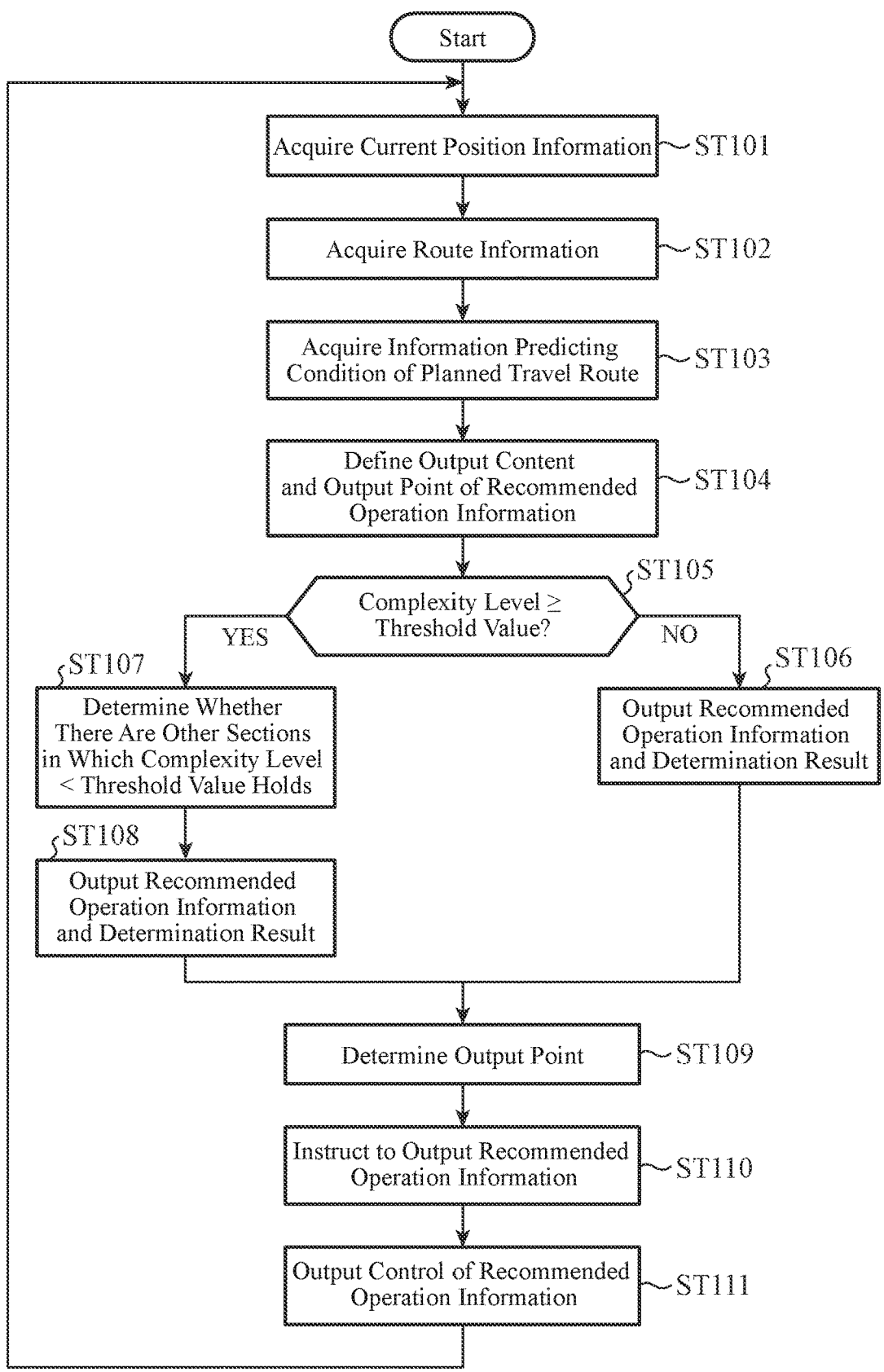
FIG. 5 is a flowchart illustrating the operation of the information provision device according to the first embodiment.

Next, the operation of the information provision device 100 will be described. FIG. 5 is a flowchart illustrating the operation of the information provision device 100 according to the first embodiment. The current position information acquiring unit 1 acquires the current position information of the vehicle (step ST101). The route information acquiring unit 2 acquires route information set in the vehicle (step ST102). The first route condition acquiring unit 3 sets a planned travel route of the vehicle from the current position information of the vehicle acquired in step ST101 and the route information acquired in step ST102 and acquires information predicting the route condition of the planned travel route having been set (step ST103). The recommended operation defining unit 4 defines the content and the output point of the recommended operation information recommended for the driver from the current position information of the vehicle acquired in step ST101, the route information acquired in step ST102, and the route condition of the planned travel route acquired in step ST103 (step ST104).

The complexity level determining unit 5 acquires a complexity level indicating whether the route condition at the output point of the defined recommended operation information is complex out of information indicating static route conditions of a section including the output point of the recommended operation information defined in step ST104 out of the information acquired in step ST103 and determines whether the complexity level is greater than or equal to a preset threshold value (step ST105). If the complexity level is less than the preset threshold value (step ST105: NO), the complexity level determining unit 5 outputs the recommended operation information defined in step ST104 and the determination result of step ST105 to the recommended operation determining unit 6 (step ST106).

On the other hand, if the complexity level is greater than or equal to the preset threshold value (step ST105: YES), the complexity level determining unit 5 acquires complexity levels in other sections not including the output point of the recommended operation information defined in step ST104 and determines whether there is a section in which the complexity level is less than the threshold value (step ST107). The complexity level determining unit 5 outputs the recommended operation information defined in step ST104 and the determination result of step ST107 to the recommended operation determining unit 6 (step ST108).

The recommended operation determining unit 6 determines an output point of the recommended operation information on the basis of either one of the determination result input in step ST106 and the determination result input in step ST108 (step ST109). The recommended operation determining unit 6 instructs the output of the content of the recommended operation information and the output point of the recommended operation information determined in step ST109 (step ST110). The output control unit 7 performs output control of the recommended operation information on the basis of the output instruction input in step ST106 or step ST110 (step ST111). Thereafter, the flowchart returns to the processing of step ST101.

Figure 6:
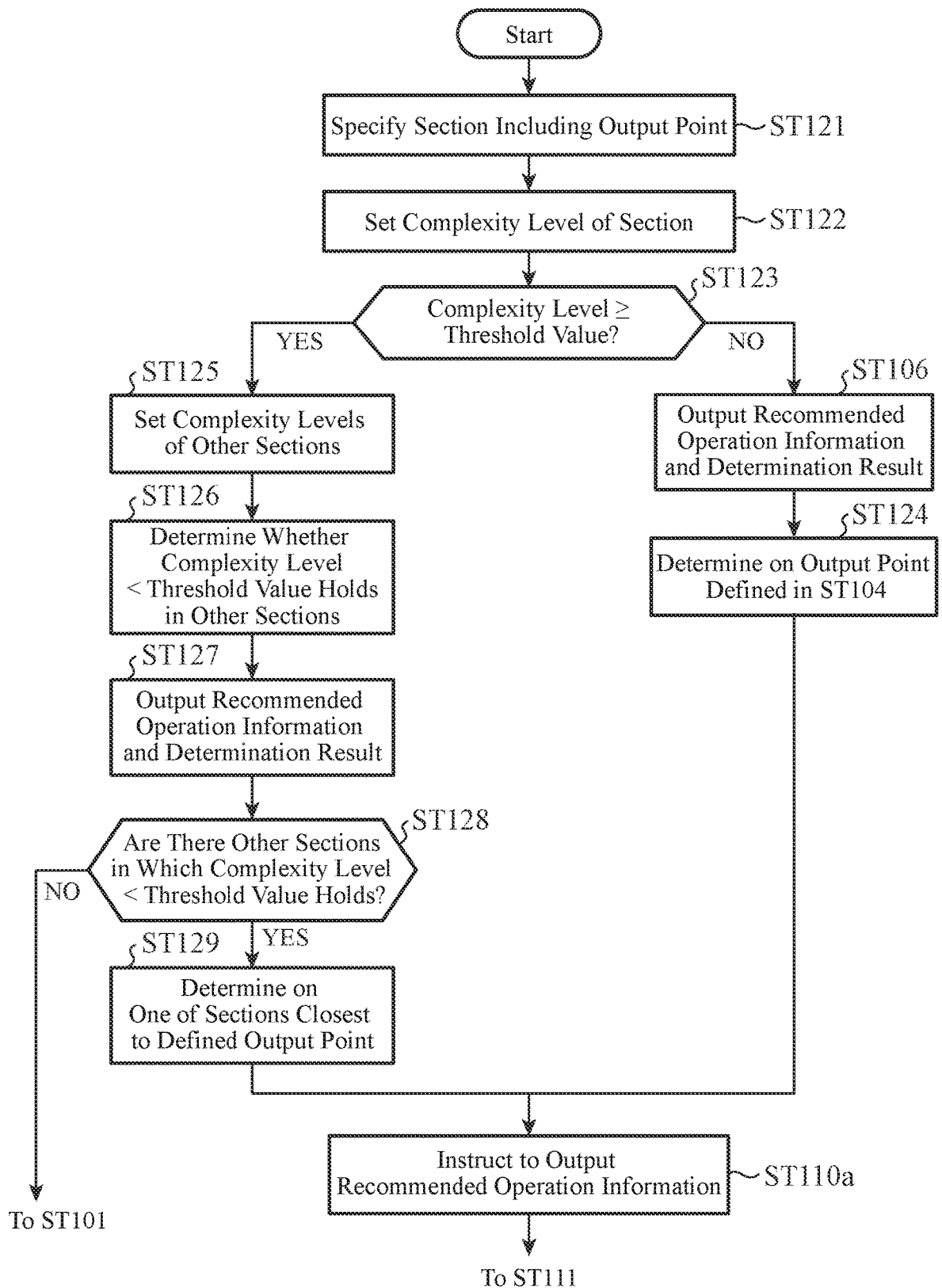
FIG. 6 is a flowchart illustrating the operation of a complexity level determining unit and a recommended operation determining unit of the information provision device according to the first embodiment.

The processing from step ST105 to step ST110 illustrated in the flowchart of FIG. 5 will be described in more detail with reference to a flowchart of FIG. 6. FIG. 6 is a flowchart illustrating the operation of the complexity level determining unit 5 and the recommended operation determining unit 6 of the information provision device 100 according to the first embodiment. When the recommended operation defining unit 4 defines the content and the output point of the recommended operation information as step ST104, the complexity level determining unit 5 specifies a section including the output point of the recommended operation information out of the planned travel route (step ST121). The complexity level determining unit 5 acquires static route conditions of the section specified in step ST121 from the information predicting the route condition of the planned travel route acquired by the first route condition acquiring unit 3 and obtains a complexity level of the specified section on the basis of the number of parameters and parameter values of parameters indicated by the acquired static route information (step ST122).

The complexity level determining unit 5 determines whether the complexity level set in step ST122 is greater than or equal to a preset threshold value (step ST123). If the complexity level is less than the preset threshold value (step ST123: NO), the complexity level determining unit 5 outputs the recommended operation information defined in step ST104 and the determination result of step ST123 to the recommended operation determining unit 6 (step ST106). The recommended operation determining unit 6 determines an output point of the recommended operation information as the output point defined in step ST104 on the basis of the determination result input in step ST106 (step ST124).

On the other hand, if the complexity level is greater than or equal to the preset threshold value (step ST123: YES), the complexity level determining unit 5 acquires information predicting static route conditions of other sections not including the output point of the recommended operation information defined in step ST104 out of the planned travel route and obtains a complexity level of each of the other sections specified on the basis of the number of parameters and parameter values of parameters indicated by the acquired information (step ST125). The complexity level determining unit 5 determines whether the complexity level set in step ST125 is less than a preset threshold value for each of the specified sections (step ST126). The complexity level determining unit 5 outputs the recommended operation information defined in step ST104 and the determination result of step ST126 of the flowchart of FIG. 5 to the recommended operation determining unit 6 (step ST127).

The recommended operation determining unit 6 refers to the determination result input in step ST127 and determines whether there is a section in which a complexity level is less than the threshold value in the other sections not including the output point of the recommended operation information (step ST128). If there is no other section in which a complexity level is less than the threshold value (step ST128: NO), the processing returns to the step ST101 of the flowchart of FIG. 5. On the other hand, if there are other sections in which a complexity level is less than the threshold value (step ST128: YES), the recommended operation determining unit 6 determines another section closest to the output point of the recommended operation information defined in ST104 as an output point (step ST129). The recommended operation determining unit 6 instructs the output of the content of the recommended operation information and the output point of the recommended operation information determined in steps ST124 and ST129 (step ST110a). Thereafter, the processing proceeds to the step ST111 in the flowchart of FIG. 5.

Figure 7:
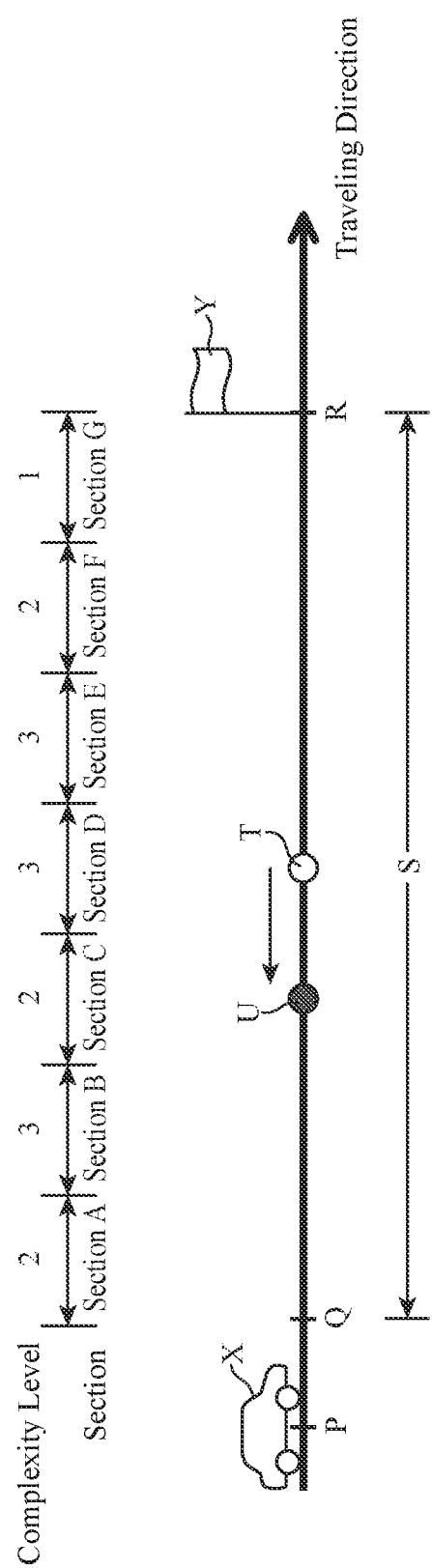
FIG. 7 is a diagram exemplifying traveling of a moving body to which information is provided by the information provision device according to the first embodiment.

Next, the processing illustrated in the flowcharts of FIGS. 5 and 6 described above will be described using specific examples. FIG. 7 is a diagram exemplifying traveling of a vehicle to which information is provided by the information provision device 100 according to the first embodiment. In FIG. 7, a vehicle X is located at a point P which is the current position, and a destination Y is set at a point R. In FIG. 7, a point Q is apart from the point P which is the current position of the vehicle by a predetermined distance, and a route set between the point Q and the point R is a planned travel route S.

In step ST103, the first route condition acquiring unit 3 performs setting of the point Q and the planned travel route S. In step ST103, the first route condition acquiring unit 3 divides the planned travel route S into seven sections ranging from a section A to a section G. Furthermore, in step ST103, the first route condition acquiring unit 3 acquires parameter values for each of the sections A to G as information predicting the planned travel route.

In step ST104, the recommended operation defining unit 4 defines an output point T of recommended operation information within the planned travel route S. In step ST121, the complexity level determining unit 5 specifies the section D including the output point T defined by the recommended operation defining unit 4. In step ST122, the complexity level determining unit 5 sets a complexity level "3" in the section D on the basis of the number of parameters and parameter values indicated by information predicting static route conditions of the section D. In step ST123, the complexity level determining unit 5 determines that the complexity level "3" of the section D is greater than or equal to a preset threshold value "3" (determined as YES).

In step ST124, the complexity level determining unit 5 obtains complexity levels on the basis of the number of parameters and parameter values indicated by information predicting static route conditions of the sections A to C and the sections E to G. In the example of FIG. 7, the complexity level determining unit 5 sets a complexity level "2" in the section A and the complexity level "3" in the section B. In step ST125, the complexity level determining unit 5 determines that there are sections in which a complexity level is less than the preset threshold value "3" in the sections A to C and the sections E to G (determined as YES). In the example of FIG. 7, the complexity level determining unit 5 determines that there is a section whose route condition is not complex in the sections A to C and the sections E to G. In step ST126, the complexity level determining unit 5 outputs position information of the sections A, C, F, and G and information indicating the content and the output point T of the recommended operation information defined in step ST104 to the recommended operation determining unit 6.

In step ST127, the recommended operation determining unit 6 specifies the section C having position information closest to the output point T of the recommended operation information out of the sections A, C, F, and G. In step ST128, the recommended operation determining unit 6 changes the output point T of the recommended operation information to an output point U that is a point within the section C. For example, assuming that a distance from the point P which is the current position of the vehicle X to the output point T of the recommended operation information is 350 m and that one section extends for 100 m, the recommended operation determining unit 6 changes to allow the output point U to be 250 m (350 m−100 m) apart from the point P. Note that the recommended operation determining unit 6 may determine the output point U by the aforementioned calculation or may select a point having a low complexity level as the output point U further considering complexity levels within the section determined by the aforementioned calculation. In step ST110a, the recommended operation determining unit 6 outputs, to the output control unit 7, the output of the recommended operation information changed to the output point U. In step ST111, the output control unit 7 outputs output control information indicating that the set content is output in the case that the vehicle X reaches the output point U.

As a result, the recommended operation information is presented to the driver while the vehicle X is traveling through the output point U in the section C in which the route condition is not complex, and the presentation of the recommended operation information to the driver is suppressed while the vehicle X is travelling through a point at which the route condition is complex, which is complex for the driver to execute the operation during driving.

As described above, according to the first embodiment, there are provided the first route condition acquiring unit 3 for acquiring the route condition predicted for the planned travel route; the recommended operation defining unit 4 for defining the content and an output point of an operation recommended for the driver using the acquired route condition; the complexity level determining unit 5 for determining whether it is complex for the driver to perform operation of the defined content at the output point defined by the recommended operation defining unit 4 or in other sections not including the defined output point by using static route conditions that do not change with a lapse of time out of the route conditions of the planned travel route; and the recommended operation determining unit 6 for determining an output point of the recommended operation information on the basis of the determination result by the complexity level determining unit 5. Therefore, it is possible to avoid provision of operation support information in a route condition under which the driver feels unsure about the operation or checking of a screen or it is complex for the driver to perform the operation.

Note that in the first embodiment described above, when the output point of the recommended operation information is determined, the recommended operation determining unit 6 may determine the output point only in the direction of the current position of the vehicle or only in the direction of the destination of the vehicle depending on the content of the recommended operation information defined by the recommended operation defining unit 4.

Second Embodiment

Figure 8:
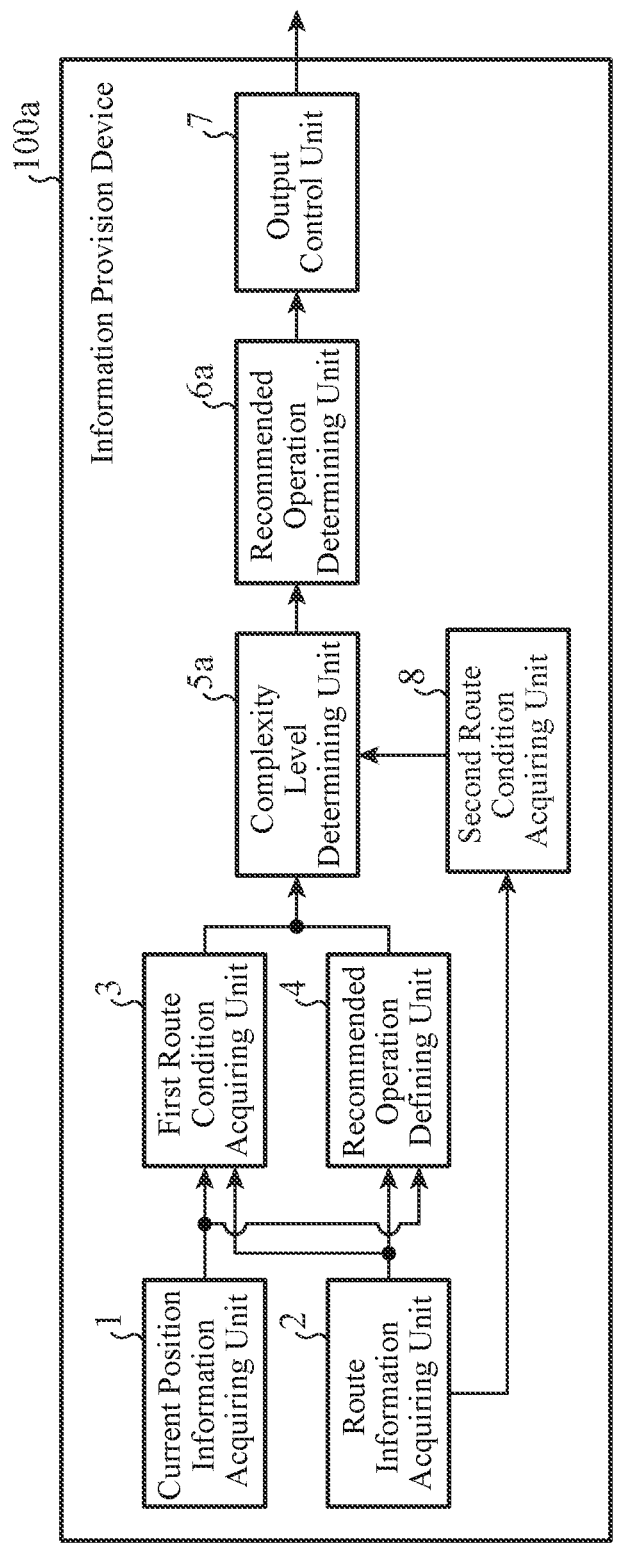
FIG. 8 is a block diagrams illustrating a configuration of an information provision device according to a second embodiment.

In the second embodiment, the case where complexity levels are larger than or equal to a threshold value in all the sections of a planned travel route will be described. FIG. 8 is a block diagram illustrating a configuration of an information provision device 100a according to a second embodiment of the present invention. The information provision device 100a according to the second embodiment is different from the information provision device 100 according to the first embodiment illustrated in FIG. 1 in that a second route condition acquiring unit 8 is added and that the complexity level determining unit 5 and the recommended operation determining unit 6 are changed to a complexity level determining unit 5a and a recommended operation determining unit 6a, respectively. In FIG. 8, the same or corresponding part as that in FIG. 1 is denoted by the same symbol and descriptions thereof are omitted.

The second route condition acquiring unit 8 acquires information obtained by monitoring the condition of a route (hereinafter referred to as a travel route) set to a range within a predetermined distance from the current position of a vehicle. For example, the second route condition acquiring unit 8 sets the range of a radius of 50 m around the current position of the vehicle as the range within the predetermined distance from the current position of the vehicle and acquires information obtained by monitoring the condition of the route set within the range of the radius of 50 m. The second route condition acquiring unit 8 is implemented by the input device 101 in the hardware configuration illustrated in FIG. 2. For example in the case where a moving body is a vehicle, the second route condition acquiring unit 8 acquires monitoring information of the travel route condition from the at least one of an onboard device, a vehicle-mounted sensor, map data, road traffic information, VICS information, and information acquired by DSRC.

The second route condition acquiring unit 8 acquires, as information obtained by monitoring the condition of the travel route, information indicating at least one of the number of lanes, a road type, a form of a road, the width of a road, a state of a road surface, the traveling velocity of the vehicle, the traveling azimuth, an acceleration/deceleration state, a stopped state, a parked state, a left/right turning state, a forwarding/reversing state, a state of changing lanes, a state of waiting for a traffic light, a state of waiting for a railway crossing, a state of passing through an entrance, an exit, a tollgate, an ETC, or a junction of a highway or a dedicated road, a state of a service area, or a parking area, a state of passing a carpool lane, a state of passing an entrance or an exit of a facility, a congested state, an accident state, a construction state, a detour state, a state of road closing, a state of passing a no-entry point, a state of waiting for an emergency vehicle, weather, season, a time zone, the distance from vehicles surrounding the host vehicle, the distance from pedestrians surrounding the host vehicle, the position of vehicles surrounding the host vehicle, and the position of pedestrians surrounding the host vehicle.

The second route condition acquiring unit 8 further acquires parameter values obtained by converting conditions indicated by the acquired information into numerical values. An example of parameter values of information obtained by monitoring the condition of the travel route acquired by the second route condition acquiring unit 8 will be described below. For example, with regard to the number of lanes of the travel route, the second route condition acquiring unit 8 acquires a parameter value "0" for no center line, a parameter value "1" for one lane on each side, a parameter value "2" for two lanes on each side, and a parameter value "3" for three lanes on each side. With regard to a road type of the travel route, for example, the second route condition acquiring unit 8 acquires a parameter value "0" for a narrow street, a parameter value "1" for a general road, a parameter value "2" for a prefectural road, a parameter value "3" for a national road, and a parameter value "4" for a highway, with regard to the form of a road of the travel route, a parameter value "0" for a normal road, a parameter value "1" for a tunnel, a parameter value "2" for a bridge and, with regard to the width of a road, a parameter value "0" for a width of less than 3.0 m, a parameter value "1" for a width greater than or equal to 3.0 m and less than 5.5 m, a parameter value "2" for a width greater than or equal to 5.5 m, and the like, for example.

The second route condition acquiring unit 8 acquires a parameter value "0" for being out of left/right turning areas, a parameter value "1" for a right turning state, and a parameter value "2" for a left turning state with regard to a left/right turning state of the travel route for example and, with regard to a state of waiting for a railway crossing, acquires a parameter value "0" for being out of railway crossing areas, a parameter value "1" for a state of waiting for a railway crossing, a parameter value "2" for a state of passing through a railway crossing, and the like, for example. The second route condition acquiring unit 8 acquires, with regard to the distance from vehicles surrounding the host vehicle for example in the case of traveling at 40 km per hour, a parameter value "0" for a distance greater than or equal to 100 m, a parameter value "1" for a distance greater than or equal to 50 m and less than 100 m, a parameter value "2" for a distance greater than or equal to 30 m and less than 50 m, a parameter value "3" for a distance less than 30 m, and the like. The second route condition acquiring unit 8 acquires, with regard to the position of vehicles surrounding the host vehicle for example, a parameter value "0" for the case where the vehicles are positioned ahead, a parameter value "1" for the case where the vehicles are positioned from the right to the front, a parameter value "2" for the case where the vehicles are positioned from the right to the rear, a parameter value "3" for the case where the vehicles are positioned behind, a parameter value "4" for the case where the vehicles are positioned in a blind spot, and the like.

Note that, although the case where the condition indicated by the information acquired by the second route condition acquiring unit 8 is converted into a numerical value which is a parameter value, the acquisition is not limited to the form of a parameter value but may be in the form of any information that allows for relative comparison of the condition of the travel route.

Like in the first embodiment, the complexity level determining unit 5a determines whether the route condition of the output point of the recommended operation information is complex or whether the route condition is complex for sections other than the section including the output point by using information indicating static route conditions out of the information predicting the route condition of the planned travel route acquired by the first route condition acquiring unit 3. When having determined that the route condition is complex for all the sections of the planned travel route, the complexity level determining unit 5a determines whether it is complex for the driver to execute an operation of the content defined by the recommended operation defining unit 4 while the vehicle is traveling on the travel route, that is, whether the route condition of the travel route is complex, by using the information obtained by monitoring the static route condition out of the information obtained by monitoring the condition of the travel route. The complexity level determining unit 5a represents the determination result of the travel route as a complexity level of the travel route in terms of a level indicating stepwise the complexity level such as level 1, level 2, level 3, and the like. Note that the complexity level determining unit 5a may indicate the complexity level by a method other than indicating by a level.

The recommended operation determining unit 6a determines an output point and the content of the recommended operation information on the basis of the determination result of the complexity level determining unit 5a. Specifically, when having determined that the route condition is complex for all the sections of the planned travel route and determines that the route condition of the travel route is not complex, the complexity level determining unit 5a determines an output point of the recommended operation information within the travel route and determines the content for reducing a burden of the driver performing the recommended operation. The output point of the recommended operation information may be any point within the travel route or may be set by selecting a point where the route condition is less complex within the travel route.

A specific example in which the recommended operation determining unit 6a determines the content of the recommended operation information as content for reducing the burden of the operation by the driver. The recommended operation determining unit 6a classifies the content of the recommended operation information depending on whether it is necessary to visually check the operation result after the driver has performed the operation of the content. The content not requiring visual checking of an operation result includes, for example, "switch AV", "adjust volume", or the like. The recommended operation determining unit 6a classifies operations not requiring visual checking of an operation result on a screen or the like into the content of type a, for example. On the other hand, the content requiring visual checking of an operation result includes, for example, "change scales", "set a convenience store as a destination", or the like. The recommended operation determining unit 6a classifies operations requiring visual checking of an operation result on a screen or the like into the content of type b, for example. The recommended operation determining unit 6a refers to the classification result of the content and, when the content of both type a and type b is included, changes the recommended operation information to have only the content of type a by erasing the content of type b.

Figure 9:
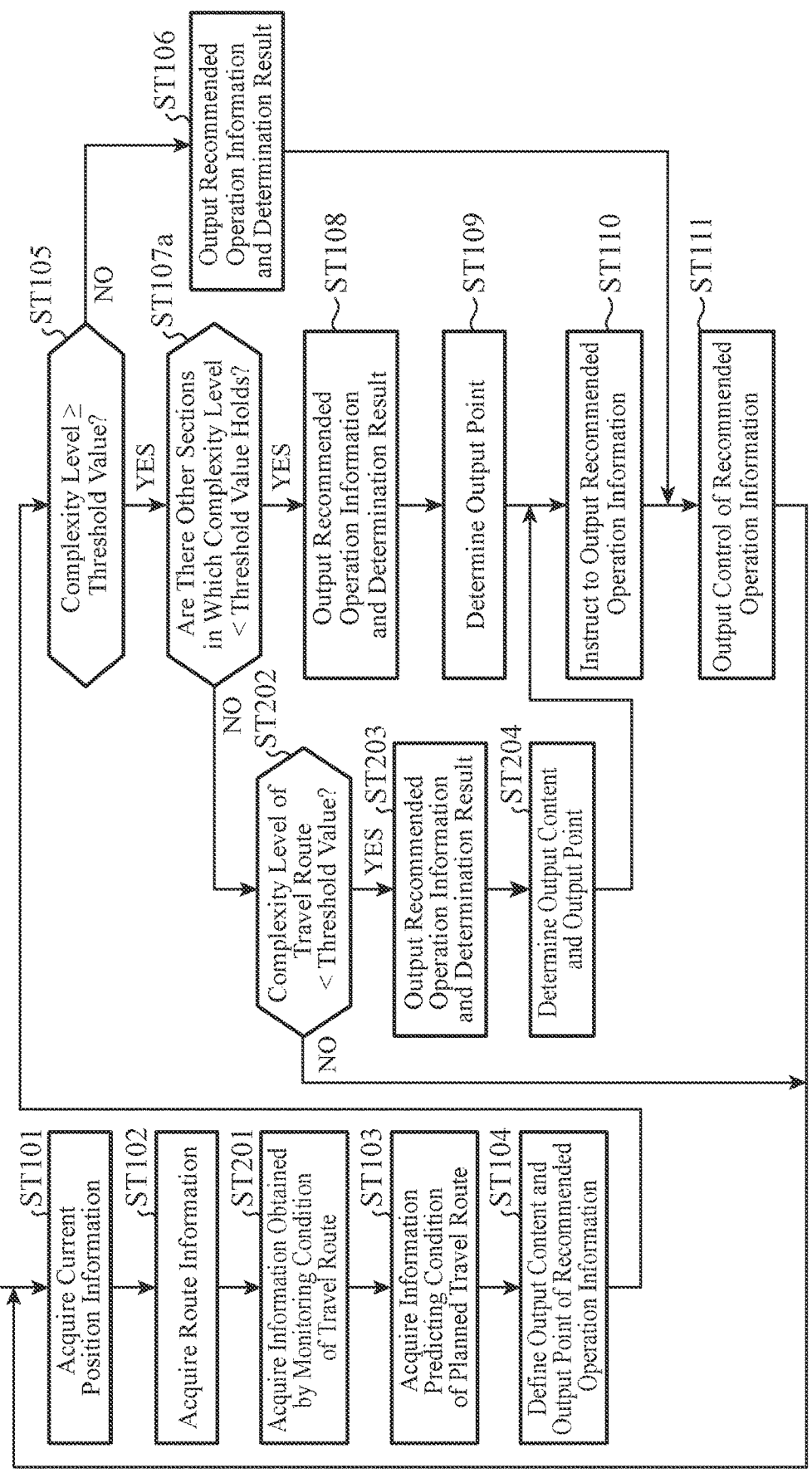
FIG. 9 is a flowchart illustrating the operation of the information provision device according to the second embodiment.

Next, the operation of the information provision device 100a will be described. FIG. 9 is a flowchart illustrating the operation of the information provision device 100a according to the second embodiment. In FIG. 9, the same steps as that in the flowchart of the first embodiment illustrated in FIG. 5 is denoted by the same symbol, and descriptions thereof will be omitted. After processing of steps ST101 and ST102 is performed, the second route condition acquiring unit 8 sets a travel route of the vehicle from current position information of the vehicle acquired in step ST101 and route information acquired in step ST102 and acquires information obtained by monitoring the condition of the travel route (step ST201). Thereafter, processing of steps ST103 to ST106 is performed. Next, the complexity level determining unit 5a acquires complexity levels of other sections not including the output point of the recommended operation information defined in step ST104 and determines whether there is a section in which a complexity level is less than a threshold value (step ST107a). If there is a section in which a complexity level is less than the threshold value (step ST107a: YES), processing of step ST108 and subsequent steps is performed.

On the other hand, if there is no section in which a complexity level is less than the threshold value (step ST107a: NO), the complexity level determining unit 5a acquires a complexity level of the travel route from the information obtained by monitoring static route conditions out of the information acquired in step ST201 and determines whether the complexity level of the travel route is less than the threshold value (step ST202). If the complexity level of the travel route is greater than or equal to the threshold value (step ST202: NO), the processing returns to the step ST101. On the other hand, if the complexity level of the travel route is less than the threshold value (step ST202: YES), the complexity level determining unit 5a outputs the determination result, the recommended operation information defined by the recommended operation defining unit 4, and the determination result of step ST202 to the recommended operation determining unit 6a (step ST203). The recommended operation determining unit 6a determines the content and the output point of the recommended operation information on the basis of the determination result input in step ST203 (step ST204). Thereafter, the processing proceeds to the step ST110.

Figure 10:
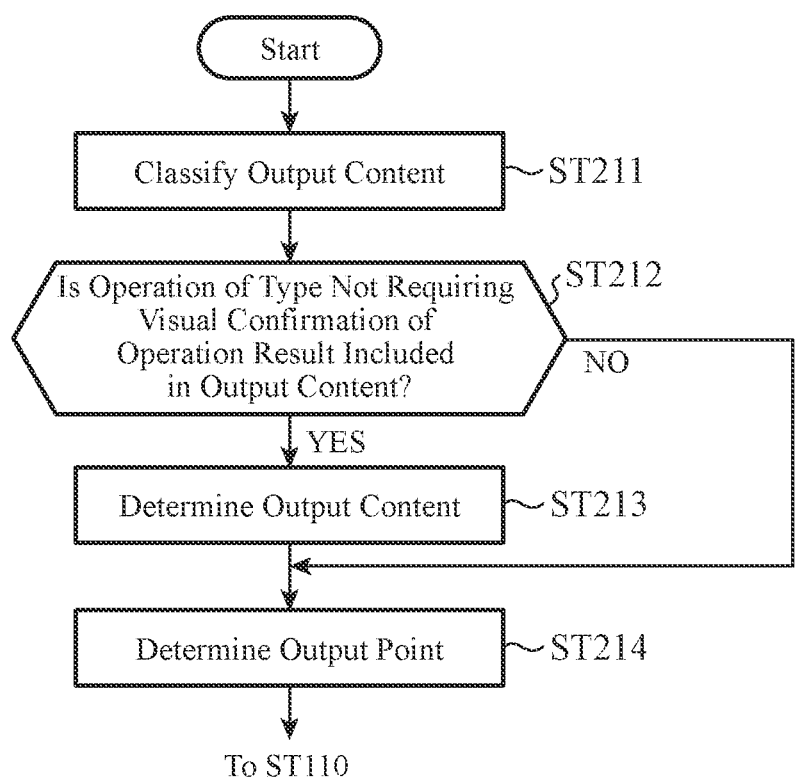
FIG. 10 is a flowchart illustrating the operation of a recommended operation determining unit of the information provision device according to the second embodiment.

With reference to a flowchart of FIG. 10, the processing of step ST203 of the flowchart of FIG. 9 will be described in more detail. FIG. 10 is a flowchart illustrating the operation of the recommended operation determining unit 6a of the information provision device 100a according to the second embodiment. On the basis of the determination result output in step ST203, the recommended operation determining unit 6a classifies the content of the recommended operation information into a type requiring visual checking of the operation result and a type not requiring visual checking of the operation result (step ST211). The recommended operation determining unit 6a refers to the types classified in step ST211 and determines whether an operation of the type not requiring visual checking of the operation result is included in the content (step ST212).

If an operation of the type not requiring visual checking of the operation result is not included in the content (step ST212: NO), the processing proceeds to processing of step ST214. On the other hand, if an operation of the type not requiring visual checking of the operation result is included in the content (step ST212: YES), the recommended operation determining unit 6a changes the content of the recommended operation information to have only operations of the type not requiring visual checking of the operation result (step ST213). The recommended operation determining unit 6a changes the output point of the recommended operation information to the travel route (step ST214), and the processing proceeds to the step ST110.

Next, the processing illustrated in the flowcharts of FIGS. 9 and 10 described above will be described using a specific example. In step ST201, the second route condition acquiring unit 8 acquires information obtained by monitoring the condition of the travel route. In step ST103, the first route condition acquiring unit 3 acquires information predicting the route condition of the planned travel route. In step ST104, the recommended operation defining unit 4 defines recommended operation information having content including three operations of "switch AV," "adjust volume", and "display a guide point", for example. Next in step ST105, the complexity level determining unit 5a determines that a complexity level of a section including the output point of the recommended operation information is "3" and is greater than or equal to the threshold value (determined as YES). In step ST106, the complexity level determining unit 5a further determines that complexity levels of all the other sections of the planned travel route is "3" and is not less than the threshold value (determined as NO).

Furthermore, in step ST202, the complexity level determining unit 5a determines that a complexity level of the travel route is "1" and is less than the threshold value (determined as YES). In step ST203, the complexity level determining unit 5a outputs the defined recommended operation information and the determination result to the recommended operation determining unit 6a. In step ST211, the recommended operation determining unit 6a classifies the two operations of "switch AV" and "adjust volume" of the recommended operation information as type a and one operation of "display a guide point" as type b. In step ST212, the recommended operation determining unit 6a determines that operations of type a not requiring visual checking of the operation result are included in the content of the recommended operation information (determined as YES). In step ST213, the recommended operation determining unit 6a changes the content of the recommended operation information to two operations of "switch AV" and "adjust volume". In step ST214, the recommended operation determining unit 6a determines the output point of the recommended operation information within the travel route.

FIGS. 11A and 11B are diagrams illustrating examples of display screens displayed on the basis of recommended operation information provided by the information provision device according to the second embodiment. FIGS. 11A and 11B illustrate examples of display screens when processing is performed on the same recommended operation information defined by the recommended operation defining unit 4. FIG. 11A is an example of a display screen based on recommended operation information provided when the information provision device 100 determines that the following conditions are satisfied.

There is a section in which a complexity level is less than a preset threshold value in the planned travel route.

The recommended operation defining unit 4 defines recommended operation information having the content of type a and the content of type b.

If the above two conditions are satisfied, as illustrated in FIG. 11A, recommended operation information of "2. Switch to radio" which is the content of type a and recommended operation information of "1. Set a convenience store as a destination" and "3. Enlarge", each of which is the content of type b, are displayed.

FIG. 11B is an example of a display screen based on recommended operation information provided when the information provision device 100 determines that the following conditions are satisfied.

There is no section in which a complexity level is less than the preset threshold value in the planned travel route.

A complexity level of the travel route is less than the preset threshold value.

The recommended operation defining unit 4 defines recommended operation information having the content of type a and the content of type b.

The recommended operation determining unit 6 changes the recommended operation information to have only the content of type b.

If the above four conditions are satisfied, as illustrated in FIG. 11B, recommended operation information of "1. Switch to radio" and "2. Reduce volume", each of which is the content of type b, is displayed. In the display screen example of FIG. 11B, recommended operation information of "Set a convenience store as a destination" and "Enlarge", each of which is the content of type b, is erased while recommended operation information of "Reduce volume" which is defined on the fourth place by the recommended operation defining unit 4 is raised to a higher place and is displayed on the second place. Note that the number of pieces recommended operation information displayed on the screen is set on the basis of the size of the screen or the like as appropriate.

As illustrated in FIGS. 11A and 11B, even in the case where there is no point suitable for outputting the recommended operation information in the planned travel route, it is possible to provide only recommended operation information in which the burden of the driver's operation is reduced while the vehicle is traveling on the travel route.

As described above, according to the second embodiment, there are provided the second route condition acquiring unit 8 for acquiring information obtained by monitoring the condition of a travel route; the complexity level determining unit 5a for determining whether a complexity level of the travel route is less than a threshold value in the case where complexity levels are larger than or equal to the threshold value in all the sections of a planned travel route; and the recommended operation determining unit 6a for determining the content of the recommended operation information to be those with less burden of operation for the driver and determining an output point within the travel route on the basis of the determination result of the complexity level determining unit 5a. Therefore, it is possible to avoid operation support in a route condition under which the driver feels unsure about the operation or checking of a screen or it is complex for the driver to perform the operation.

Third Embodiment

Figure 12:
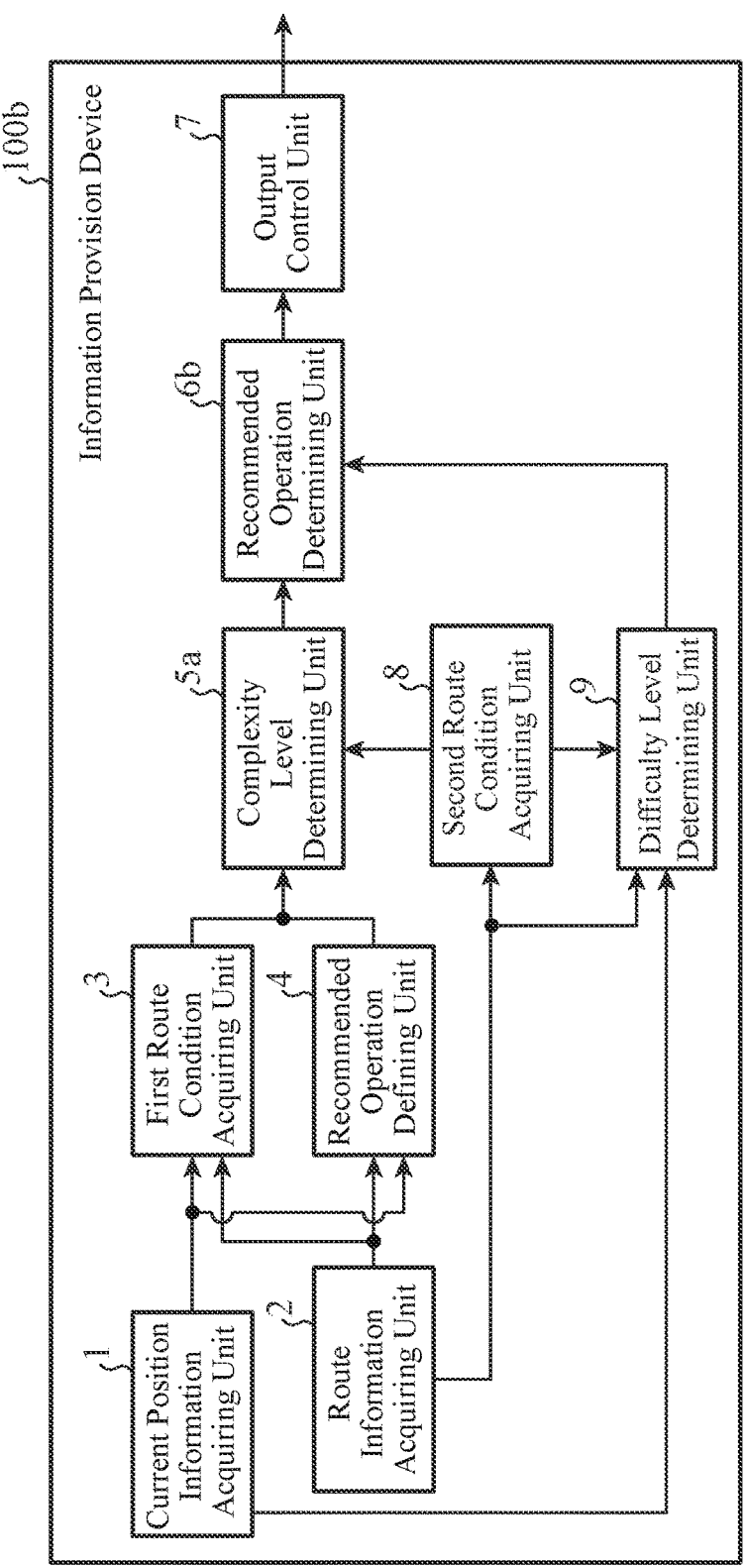
FIG. 12 is a block diagram illustrating a configuration of an information provision device according to a third embodiment.

In the third embodiment, a configuration for determining a difficulty level of a travel route while a vehicle is traveling on the travel route including an output point of recommended operation information will be described. FIG. 12 is a block diagram illustrating a configuration of an information provision device 100b according to a third embodiment. The information provision device 100b according to the third embodiment is different from the information provision device 100a according to the second embodiment illustrated in FIG. 8 in that a difficulty level determining unit 9 is added and that the recommended operation determining unit 6a is changed to a recommended operation determining unit 6b. In FIG. 12, the same or corresponding part as that in FIG. 8 is denoted by the same symbol and descriptions thereof are omitted.

The difficulty level determining unit 9 sets difficulty levels at the time of traveling on a travel route including an output point on the basis of the number of parameters and parameter values of parameters indicated by information obtained by monitoring dynamic conditions out of information obtained by monitoring the condition of the travel route acquired by a second route condition acquiring unit 8 and performs determination of the set difficulty levels. The timing at which the difficulty level determining unit 9 performs determination of the difficulty level is the time when a vehicle travels on the travel route including an output point indicated as output control information in the step ST111 of the flowcharts of FIG. 5 of the first embodiment and FIG. 9 of the second embodiment.

The difficulty level determining unit 9 is implemented by the processing circuit in the hardware configuration illustrated in FIG. 2. That is, each of a recommended operation defining unit 4, a complexity level determining unit 5a, the recommended operation determining unit 6b, an output control unit 7, and the difficulty level determining unit 9 has a processing circuit for determining the difficulty level at the time of executing a recommended operation during travel on the travel route including the output point of the operation information.

The aforementioned dynamic conditions refer to conditions of a route that change with the lapse of time of about several minutes to several hours, for example. Exemplary conditions include the condition of a road surface, an acceleration/deceleration state, a state of passing through an ETC point, the distance from vehicles surrounding the host vehicle, the position of vehicles surrounding the host vehicle, and the position of pedestrians surrounding the host vehicle. On the basis of the number of parameters and parameter values of parameters of the information obtained by monitoring these dynamic conditions of the travel route, the difficulty level determining unit 9 represents the ease of traveling on the travel route including the output point in terms of a difficulty level. The difficulty level determining unit 9 sets a higher difficulty level as a parameter value of each parameter is larger.

The difficulty level determining unit 9 sets a difficulty level of the travel route with reference to a predefined table illustrated in FIG. 13, for example. In the table illustrated in FIG. 13, the "number of route conditions" is the number of pieces of information acquired as dynamic conditions in a travel section. An item "parameter value" of the table represents the sum of parameter values of information obtained by monitoring dynamic conditions acquired in a travel section. An item "difficulty level" in the table represents a value of a difficulty level to be set corresponding to the sum of parameter values. In FIG. 13, a case where the difficulty level determining unit 9 uses parameter values that falls into three-step criteria as a determination basis of the difficulty level is illustrated as an example. The difficulty level determining unit 9 sets a difficulty level "1" for a parameter indicating a condition where a person or a light vehicle is approaching the host vehicle such as a condition in which a distance between a pedestrian and the host vehicle is short or a condition in which a bicycle is approaching the host vehicle. The difficulty level determining unit 9 sets a difficulty level "2" for a parameter indicating a condition where whether a surrounding vehicle is approaching the host vehicle such as a condition in which a preceding vehicle is reducing the speed and changing lanes or a condition where the a two-wheeled vehicle is about to overtake the host vehicle. The difficulty level determining unit 9 sets a difficulty level "3" for a parameter indicating a condition where a complexity level increases quite a lot in the case of operation while one hand is released from the steering wheel such as during heavy rain and icy roads.

One of the difficulty levels of "1", "2", and "3", for example, illustrated in the table is set as a preset set value used for determination by the difficulty level determining unit 9. For example in the case where a value "2" is set in the difficulty level determining unit 9 and a difficulty level of a travel route is greater than or equal to "2", the difficulty level determining unit 9 determines that the travel section is difficult to travel in. When having determined that the difficulty level is greater than or equal to the threshold value, the difficulty level determining unit 9 outputs an instruction to change the recommended operation information together with the difficulty level to the recommended operation determining unit 6b.

The recommended operation determining unit 6b determines at least one of the content, an output point, a mode of output, selection of an output destination, the number of output events, and an order of priorities of the current recommended operation information on the basis of the input difficulty level. For example when a difficulty level input from the difficulty level determining unit 9 is greater than or equal to "1", the recommended operation determining unit 6b determines an output point of the recommended operation information. The recommended operation determining unit 6b makes a change such as determining an output point at a point where a pedestrian is predicted to leave in the case where the pedestrian is approaching. For example when a difficulty level input from the difficulty level determining unit 9 is greater than or equal to "2", the recommended operation determining unit 6b determines a mode of output of the recommended operation information. The recommended operation determining unit 6b, for example, makes a change such as increasing the size of displayed characters, changing colors of displayed characters, changing fonts of displayed characters, and changing the sound of audio output. For example when a difficulty level input from the difficulty level determining unit 9 is larger than or equal to "2", the recommended operation determining unit 6b selects a plurality of output destinations of the recommended operation information. For example, the recommended operation determining unit 6b makes a change such as selecting output destinations to output to two display monitors and selecting only a speaker on the driver side to output sound.

For example when a difficulty level input from the difficulty level determining unit 9 is greater than or equal to "2", the recommended operation determining unit 6b determines the content of the recommended operation information. Describing the type of content as an example, the recommended operation determining unit 6b makes a change such as generating recommended operation information the content of which is switched from those requiring visual checking of an operation result to those not requiring visual checking of an operation result. For example when a difficulty level input from the difficulty level determining unit 9 is greater than or equal to "2", the recommended operation determining unit 6b determines the number of output events of the recommended operation information. Describing the type of content as an example, the recommended operation determining unit 6b makes a change such as generating recommended operation information the number of output events of which is reduced by erasing content requiring visual checking of an operation result and maintaining only those not requiring visual checking of an operation result. For example when a difficulty level input from the difficulty level determining unit 9 is greater than or equal to "2", the recommended operation determining unit 6b changes the order of priorities of the recommended operation information. Describing the type of content as an example, the recommended operation determining unit 6b makes a change such as generating recommended operation information in which a priority order of content requiring visual checking of an operation result is lowered and a priority order of content not requiring visual checking of an operation result is raised.

Regarding a change in the recommended operation information, the recommended operation determining unit 6b may make a plurality of changes or a single change. The recommended operation determining unit 6b may perform determination of recommended operation information depending on the difficulty level determined by the difficulty level determining unit 9 or may set depending on whether there are parameters used for the determination processing of a difficulty level by the difficulty level determining unit 9. To set depending on whether there are parameters used for the determination processing performed by the recommended operation determining unit 6b is to increase the font size only during travel on a highway, to output by sound at a specific position only when a following vehicle is approaching, and the like. Another example is that, when the recommended operation determining unit 6b is scheduled to recommend "display the next guide point" while the vehicle is traveling 700 m before an intersection where the vehicle is going to turn right but a two-wheeled vehicle is trying to overtake the host vehicle, the recommended operation determining unit 6b determines the recommended operation information in which the output point is changed to 600 m before the intersection to turn right such that recommendation is made after the two-wheeled vehicle passes the host vehicle.

Figure 14:
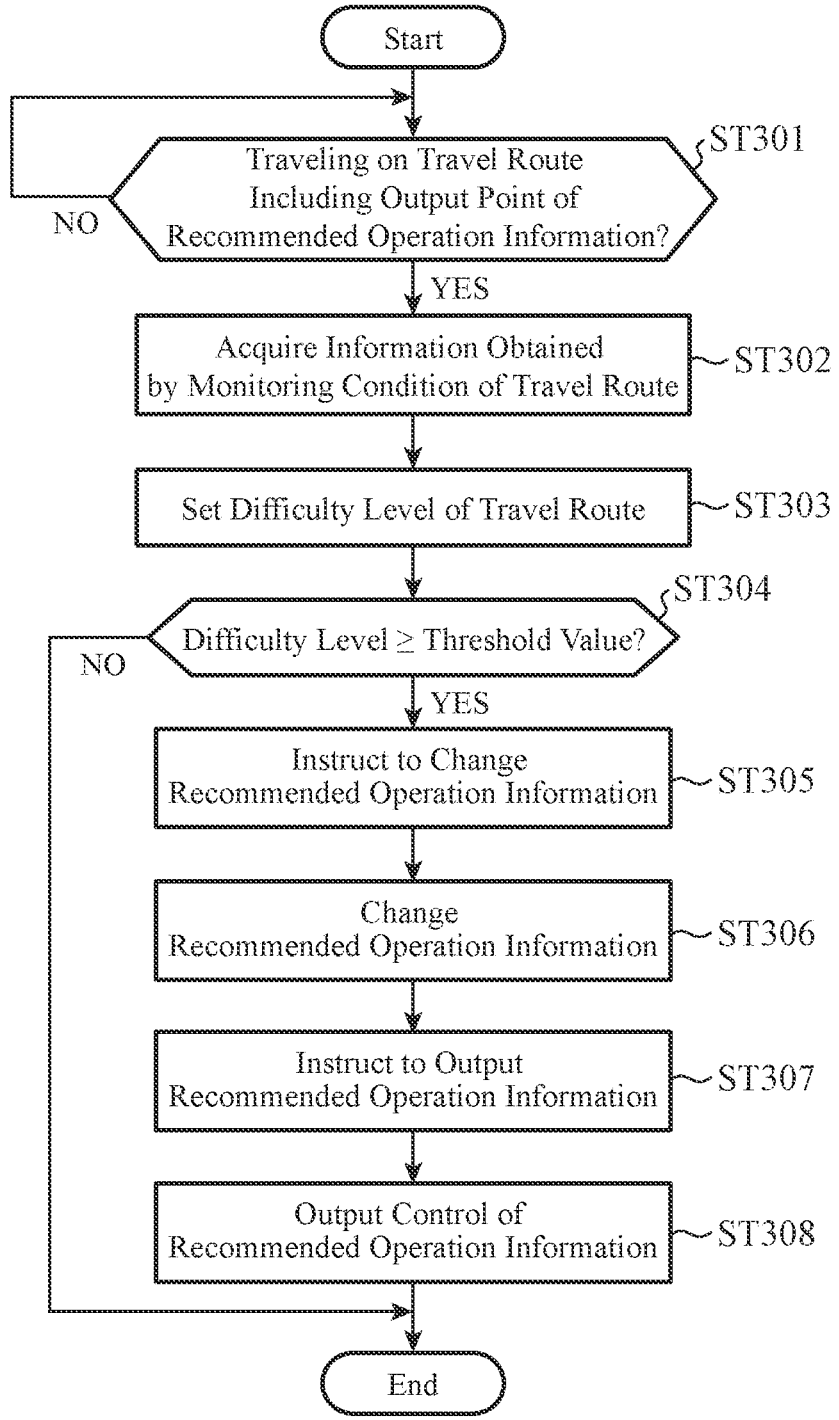
FIG. 14 is a flowchart illustrating the operation of the information provision device according to the third embodiment.

Next, the operation of the information provision device 100b will be described. FIG. 14 is a flowchart illustrating the operation of the information provision device 100b according to the third embodiment. The processing illustrated in the flowchart of FIG. 14 is executed after the processing of step ST111 of the flowchart of FIG. 5 of the first embodiment and the flowchart of FIG. 9 of the second embodiment is performed. When obtaining current position information of the vehicle from the current position information acquiring unit 1 and route information from the route information acquiring unit 2, the difficulty level determining unit 9 determines whether the vehicle is currently traveling on a travel route including an output point of recommended operation information (step ST301). If the difficulty level determining unit 9 determines that the vehicle is not traveling on a travel route including an output point (step ST301: NO), the difficulty level determining unit 9 continues the determination processing of step ST301.

On the other hand, if the difficulty level determining unit 9 determines that the vehicle is traveling on a travel route including an output point (step ST301: YES), the difficulty level determining unit 9 acquires information obtained by monitoring dynamic conditions out of information acquired by monitoring the condition of the travel route acquired by the second route condition acquiring unit 8 (step ST302). The difficulty level determining unit 9 sets a difficulty level of the travel route on the basis of parameters indicated by the information acquired in step ST302 (step ST303). The difficulty level determining unit 9 determines whether the difficulty level set in step ST303 is greater than or equal to a preset threshold value (step ST304). If the difficulty level is not greater than or equal to the preset threshold value (step ST304: NO), the processing is terminated.

On the other hand, if the difficulty level is greater than or equal to the preset threshold value (step ST304: YES), the difficulty level determining unit 9 outputs a change instruction of the recommended operation information together with the difficulty level set in step ST303 (step ST305). On the basis of the change instruction output in step ST305, the recommended operation determining unit 6b changes at least one of the content, an output point, a mode of output, the number of output destinations, the number of output events, and an order of priorities of the recommended operation information (step ST306). The recommended operation determining unit 6b instructs output of the recommended operation information changed in step ST306 (step ST307). The output control unit 7 performs output control of the recommended operation information on the basis of the output instruction input in step ST307 (step ST308) and terminates the processing.

The processing illustrated in the flowchart of FIG. 14 described above will be described using a specific example. Note that it is assumed that a value set in the difficulty level determining unit 9 for determination of a difficulty level is "2". In step ST303, the difficulty level determining unit 9 sets the difficulty level to "3" for example in the case of torrential rain. In step ST304, the difficulty level determining unit 9 determines that the difficulty level "3" is greater than the set value "2" and thus in step ST305 outputs a change instruction of the recommended operation information together with information indicating the difficulty level "3". In step ST306, the recommended operation determining unit 6b changes the recommended operation information.

On the other hand, the difficulty level determining unit 9 sets the difficulty level to "1" for example when a bicycle is traveling around the vehicle in step ST303. The difficulty level determining unit 9 further determines that the difficulty level "1" is less than the set value "2" in step ST304 and terminates the processing.

As described above, according to the third embodiment, there are provided the difficulty level determining unit 9 for determining a difficulty level of traveling on a travel route by using dynamic route conditions of the travel route when a moving body is traveling on the travel route including an output point of recommended operation information; and the recommended operation determining unit 6b for changing the content of the current recommended operation information on the basis of the determined difficulty level. Therefore, it is possible to change to content that reduces the burden of operation or checking of a screen by the driver in a route condition under which the driver feels unsure about the operation or checking of a screen or it is complex for the driver to perform the operation.

Fourth Embodiment

In a fourth embodiment, described is a configuration for determining a difficulty level of a travel route while a vehicle is traveling on a travel route including an output point of recommended operation information by using information obtained by monitoring static route conditions in addition to information obtained by monitoring dynamic conditions of the travel route. Since the configuration of an information provision device according to the fourth embodiment is similar to the configuration of the information provision device illustrated in FIG. 12 of the third embodiment in the drawings, illustration of a block diagram is omitted. The same or corresponding part as that of the information provision device 100*b* of the third embodiment is denoted by the same symbol and descriptions thereof are omitted.

A difficulty level determining unit 9 sets a difficulty level of a travel route on the basis of the number of parameters and parameter values of parameters indicated by information obtained by monitoring dynamic conditions and static route conditions out of information obtained by monitoring the condition of the travel route acquired by a second route condition acquiring unit 8 and performs determination of the set difficulty levels. The timing at which the difficulty level determining unit 9 performs determination of the difficulty level is the time when a vehicle travels on the travel route including an output point indicated as output control information in the step ST111 of the flowcharts of FIG. 5 of the first embodiment and FIG. 9 of the second embodiment.

The aforementioned dynamic conditions include, for example, the condition of a road surface, an acceleration/deceleration state, a state of passing through an ETC point, the distance from vehicles surrounding the host vehicle, the position of vehicles surrounding the host vehicle, and the position of pedestrians surrounding the host vehicle. Moreover, the aforementioned static route conditions include conditions such as the number of lanes, a type of a road, a form of a road, and the width of a road. On the basis of the number of parameters and parameter values of parameters of the information obtained by monitoring these dynamic conditions and static route conditions of the travel route, the difficulty level determining unit 9 represents the ease of traveling on the travel route in terms of a difficulty level. The difficulty level determining unit 9 sets a higher difficulty level as a parameter value of each parameter is larger.

As illustrated in FIG. 13, the difficulty level determining unit 9 uses parameter values that falls into three-step criteria as a determination basis of the difficulty level. The difficulty level determining unit 9 sets a difficulty level "1" for a parameter indicating a condition where a person or a light vehicle is approaching the host vehicle at a particular point such as a condition in which a distance between a pedestrian and the host vehicle is short in a narrow path or a condition in which a bicycle is approaching the host vehicle near an intersection. The difficulty level determining unit 9 sets a difficulty level "2" for a parameter indicating a condition where whether a surrounding vehicle is approaching the host vehicle at a particular point such as a condition in which a preceding vehicle is reducing the speed and changing lanes on a highway or a condition where the a two-wheeled vehicle is about to overtake the host vehicle on a main road. The difficulty level determining unit 9 sets a difficulty level "3" for a parameter indicating a condition where a complexity level increases quite a lot in the case of operation while one hand is released from the steering wheel at a particular point such as during heavy rain on a highway and icy roads in a mountain.

In the case where "2" is set as the setting value used for the determination by the difficulty level determining unit 9 and the difficulty level of the travel route is greater than or equal to "2", the difficulty level determining unit 9 determines that the travel route is difficult to travel on. When having determined that the difficulty level is greater than or equal to the threshold value, the difficulty level determining unit 9 outputs an instruction to change the recommended operation information together with the difficulty level to the recommended operation determining unit 6*b*. The recommended operation determining unit 6*b* changes at least one of the content, an output point, a mode of output, selection of an output destination, the number of output events, and an order of priorities of the current recommended operation information on the basis of the input difficulty level.

The operation of the information provision device 100*b* of the fourth embodiment is different only in the point that information obtained by monitoring static route conditions is acquired in addition to information obtained by monitoring dynamic conditions out of the information obtained by monitoring the condition of the travel route acquired by the second route condition acquiring unit 8 in step ST302 illustrated in the flowchart of FIG. 14 of the third embodiment. The other processing is the same as the processing illustrated in the flowchart of FIG. 14.

Along the flowchart of FIG. 14, the processing operation of the information provision device 100*b* of the fourth embodiment will be described using a specific example. Note that it is assumed that a value set in the difficulty level determining unit 9 for determination of a difficulty level is "2". In step ST303, the difficulty level determining unit 9 sets the difficulty level to "3" for example in the case of sudden heavy rain on a highway. In step ST304, the difficulty level determining unit 9 determines that the difficulty level "3" is greater than the set value "2" and thus in step ST305 outputs a change instruction of the recommended operation information together with information indicating the difficulty level "3". In step ST306, the recommended operation determining unit 6*b* changes the recommended operation information.

On the other hand, the difficulty level determining unit 9 sets the difficulty level to "1" for example when a bicycle is traveling around the vehicle near an intersection in step ST303. The difficulty level determining unit 9 further determines that the difficulty level "1" is less than the set value "2" in step ST304 and terminates the processing.

As described above, according to the fourth embodiment, the difficulty level determining unit 9 determines the difficulty level of a travel route by using static route conditions in addition to dynamic route conditions of the travel route out of the information obtained by monitoring the condition of the travel route when a moving body is traveling on the travel route including an output point of recommended operation information, and the recommended operation determining unit 6*b* changes the content of the current recommended operation information on the basis of the determined difficulty level. Therefore, it is possible to change to content that reduces the burden of operation or checking of a screen by the driver in a route condition under which the driver feels unsure about the operation or checking of the screen or it is complex for the driver to perform the operation.

Fifth Embodiment

In a fifth embodiment, a configuration for defining output information of audio output or display output as recommended operation information is illustrated. Since the configuration of an information provision device according to the fifth embodiment is similar to the configuration of the information provision device 100*b* illustrated in FIG. 12 of the third embodiment in the drawings, illustration of a block diagram is omitted. The same or corresponding part as that of the information provision device 100*b* of the third embodiment is denoted by the same symbol and descriptions thereof are omitted.

A recommended operation determining unit 6b specifies whether to perform audio output or display output of recommended operation information by using at least one of the content of the recommended operation information and a difficulty level of a travel route set by a difficulty level determining unit 9 and adds the specified output method to the recommended operation information. In the case of specifying an output method using the content of the recommended operation information, for example in the case where the content of the recommended operation information is "display information of the next service area", since a host vehicle is always located on a highway, the recommended operation determining unit 6b performs audio output together with display output. In the case of specifying using a difficulty level, for example when the difficulty level is "3", the recommended operation determining unit 6b always perform audio output only.

The recommended operation determining unit 6b changes at least one of the content, an output point, a mode of output, the number of output destinations, the number of output events, and an order of priorities of the recommended operation information as the processing of step ST306 illustrated in the flowchart of FIG. 14 of the third embodiment and then further specifies an output method of the changed recommended operation information by using the content of the recommended operation information or the difficulty level of the travel route. For example, in the case where the difficulty level is "3", the recommended operation determining unit 6b generates recommended operation information specifying an output method of audio output only. In step ST307, the recommended operation determining unit 6b instructs output of the changed recommended operation information.

As described above, according to the fifth embodiment, the recommended operation determining unit 6b specifies an output method of recommended operation information by using the content of the recommended operation information or a difficulty level of a travel route. Therefore, it is possible to change to content that reduces the burden of operation or checking of a screen by the driver in a route condition under which the driver feels unsure about the operation or checking of the screen or it is complex for the driver to perform the operation.

Sixth Embodiment

Figure 15:
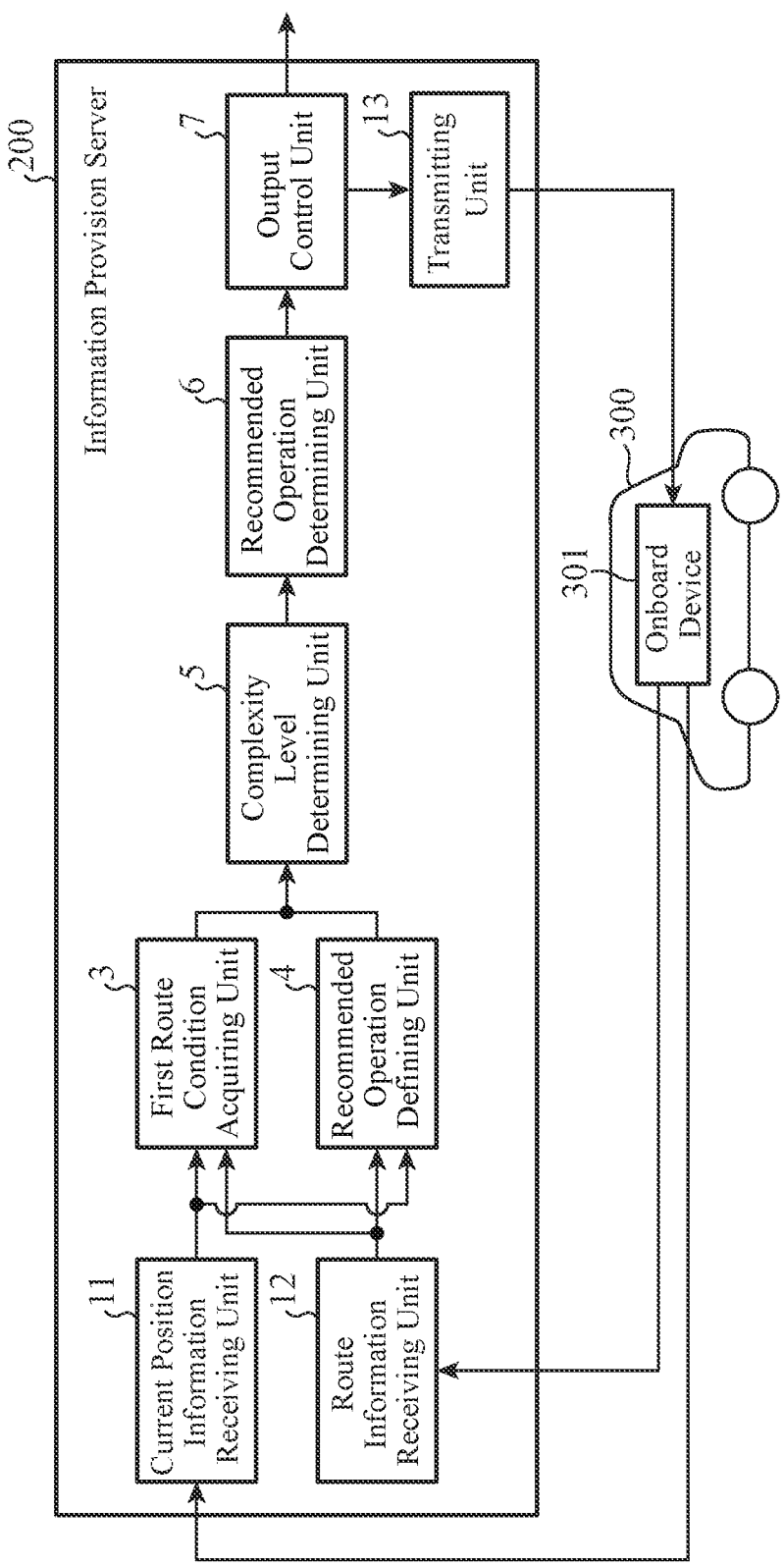
FIG. 15 is a block diagram illustrating a configuration of an information provision server according to a sixth embodiment.

In a sixth embodiment, an information provision server having the configuration described in the first embodiment will be described. FIG. 15 is a block diagram illustrating a configuration of an information provision server 200 according to the sixth embodiment. The information provision server 200 includes a current position information receiving unit 11, a route information receiving unit 12, a first route condition acquiring unit 3, a recommended operation defining unit 4, a complexity level determining unit 5, a recommended operation determining unit 6, an output control unit 7, and a transmitting unit 13. The information provision server 200 is connected to an onboard device 301 such as a navigation system mounted on a vehicle 300.

The first route condition acquiring unit 3, the recommended operation defining unit 4, the complexity level determining unit 5, the recommended operation determining unit 6, and the output control unit 7 are the same as the components illustrated in the information provision device 100 of the first embodiment described above, and thus descriptions thereof will be omitted.

The current position information receiving unit 11 receives current position information of the vehicle 300 from the onboard device 301. The current position information indicates the latitude and the longitude of the current position of the vehicle 300 acquired by a GPS mounted on the onboard device 301 of the vehicle 300. The route information receiving unit 12 receives route information set from the onboard device 301. The route information receiving unit 12 receives, as route information, information indicating whether a destination is set, information indicating a route to the destination in the case where the destination is set, information indicating a distance from the current position of the vehicle 300 to the destination when the destination is set, information indicating the latitude and the longitude of the destination, and the like. The route information receiving unit 12 also acquires information of the onboard device, information acquired by an onboard sensor, map data, road traffic information, VICS acquisition information, DSRC acquisition information, and the like from the onboard device 301. With regard to information indicating whether a destination is set, for example, the route information receiving unit 12 receives information in which the case where a destination is set is indicated by "1" or the case where a destination is not set is indicated by "0". The route information receiving unit 12 receives information indicating, for example, a distance from the vehicle 300 to the destination as "1200 m" with regard to information indicating the distance from the current position of the vehicle 300 to the destination.

On the basis of the current position information of the vehicle 300 received by the current position information receiving unit 11 and the route information received by the route information receiving unit 12, the first route condition acquiring unit 3 acquires information predicting the route condition of a planned travel route. The recommended operation defining unit 4 defines the content and an output point of the recommended operation information on the basis of the current position information received by the current position information receiving unit 11, the route information received by the route information receiving unit 12, and the information predicting the route condition of the planned travel route acquired by the first route condition acquiring unit 3. On the basis of the display control instruction of the recommended operation information of the output control unit 7, the transmitting unit 13 outputs the recommended operation information to the onboard device 301 connected thereto.

As described above, according to the sixth embodiment, since the function of defining and changing recommended operation information is operated on the server, and thus it is easy to update or change the function of providing information. In addition, the information provision server 200 can acquire information related to the route condition from various aspects via a network, thereby enabling grasping accurate route conditions. As a result, it is possible to perform safer operation support to the driver.

In the aforementioned sixth embodiment, a learning database may be generated in which the recommended operation information defined by the recommended operation defining unit 4 or the recommended operation information changed by the recommended operation determining unit 6 is accumulated as learning data together with position information. When defining the content and the output point of the recommended operation information, the recommended operation defining unit 4 may refer to the learning database and take into consideration a history of definitions in the past or a history of changing the content or an output point in the past and other information.

Figure 16:
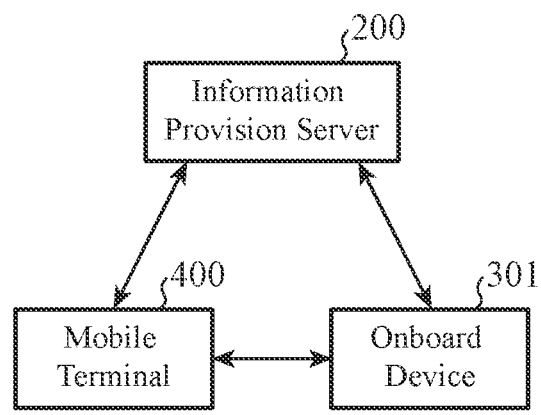
FIG. 16 is a configuration example illustrating connection among the information provision server according to the sixth embodiment, an onboard device, and a mobile terminal.

In the sixth embodiment, some of the functions of the onboard device 301 may be implemented by using a function of a mobile terminal such as a smartphone. FIG. 16 is a diagram illustrating a configuration example using the information provision server 200, the onboard device 301, and a mobile terminal 400. For example in a case where the onboard device 301 does not have a GPS function, current position information of the vehicle 300 may be acquired using a GPS function of the mobile terminal 400 held by the driver or a passenger. If there is a function that can be implemented in place of the onboard device 301 in addition to the GPS function, the mobile terminal 400 may execute the function.

Note that in the aforementioned sixth embodiment, the configuration of the first embodiment is used to the information provision server 200; however, the information provision server may be configured by using the configurations of the second to the fifth embodiments.

Seventh Embodiment

Figure 17:
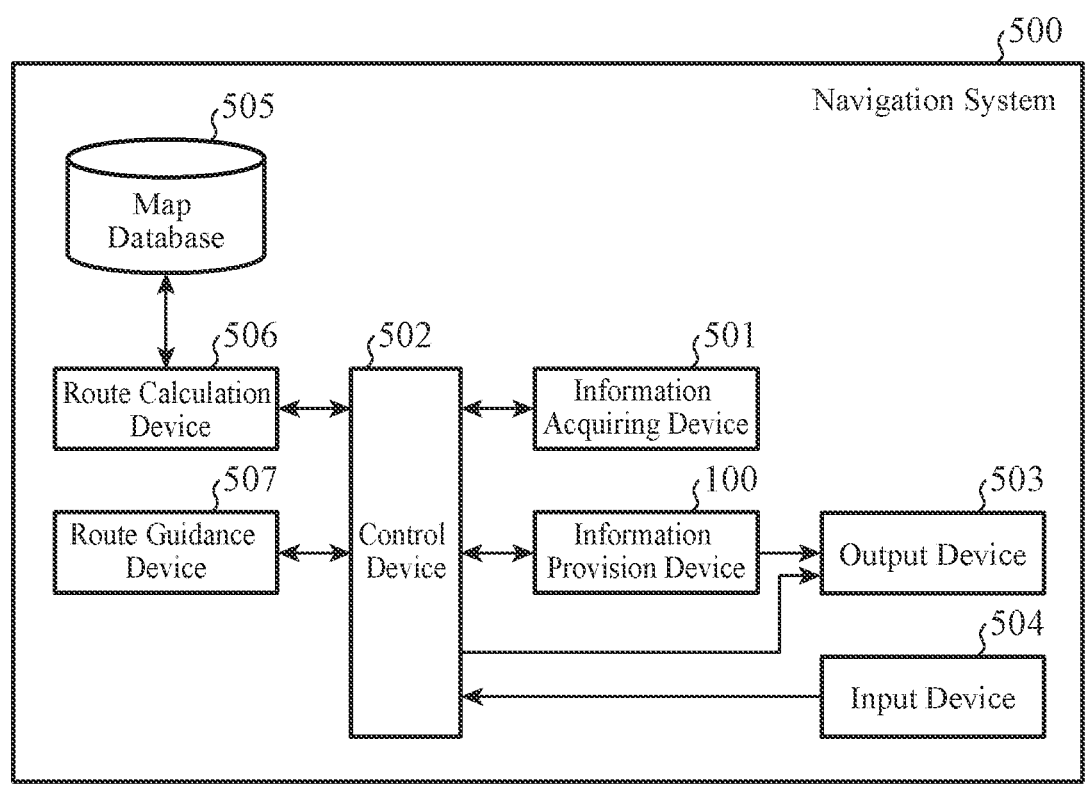
FIG. 17 is a block diagram illustrating a configuration of a navigation system according to a seventh embodiment.

The information provision devices 100, 100a, and 100b according to the first to the fifth embodiments described above can be used to, for example, a navigation system including a speaker and an operation screen. In a seventh embodiment, the case where the information provision device of the first embodiment is used to a navigation system will be described. FIG. 17 is a block diagram illustrating a configuration of a navigation system 500 according to the seventh embodiment. The navigation system 500 is a device installed in a vehicle and executes route guidance to a destination, for example, and includes an information acquiring device 501, a control device 502, the information provision device 100, an output device 503, an input device 504, a map database 505, a route calculation device 506, and a route guidance device 507. The operation of each of the devices of the navigation system 500 is integrally controlled by the control device 502.

The information acquiring device 501 includes, for example, a current position detection means, a wireless communication means, a surrounding information detecting means, and other means and acquires the current position of the host vehicle, the surroundings of the host vehicle, and information detected by other vehicles. The output device 503 includes, for example, a display means, a display control means, an audio output means, an audio control unit, and other means and notifies the driver of information. The input device 504 is implemented by an operation input means such as a button and a touch panel and an audio input means such as a microphone and receives information input from the driver. The information provision device 100 is a device having the configuration and the functions described in the first embodiment. The information provision device 100 defines or changes recommended operation information on the basis of the control information from the control device 502 and performs output control on the output device 503.

The map database 505 is a storage area for storing map data and is implemented as a storage device such as an HDD, RAM, or the like. The route calculation device 506 calculates a route from a start point to a destination on the basis of the start point, the destination, and the map data. The route guidance device 507 provides route guidance for the route calculated by the route calculation device 506.

For example when a destination of the vehicle is set in the navigation system 500, route calculation based on the driver's operation is performed via the control device 502, the information acquiring device 501, the route calculation device 506, and the route guidance device 507, and route guidance is given to the driver from the output device 503. Furthermore, when the navigation system 500 sets the destination of the vehicle and calculates a route, the information provision device 100 performs the processing illustrated in the flowcharts of FIGS. 5 and 6 described above, defines or changes the recommended operation information, and performs output control of the recommended operation information.

As described above, according to the seventh embodiment, the content and an output point of the recommended operation information recommended for presentation to the driver are defined or changed and presented to the driver via the output device 503 by using the current position of the host vehicle acquired by the navigation system 500, the surroundings of the host vehicle, and information detected by other vehicles, and a route from a start point to the destination. Therefore, it is possible to avoid operation support in a route condition under which the driver feels unsure about the operation or checking of a screen or it is complex for the driver to perform the operation.

Other than the above, within the scope of the present invention, the present invention may include a flexible combination of the respective embodiments, a modification of any component of the respective embodiments, or omission of any component in the respective embodiments.

INDUSTRIAL APPLICABILITY

An information provision device according to the present invention changes the content and an output point of recommended operation information on the basis of the route condition in which a moving body travels and thus is suitable for use in a navigation device that presents route guidance depending on the condition of the route on which the moving body travels.

REFERENCE SIGNS LIST

1: Current position information acquiring unit, 2: Route information acquiring unit, 3: First route condition acquiring unit, 4: Recommended operation defining unit, 5, 5a: Complexity level determining unit, 6, 6a, 6b: Recommended operation determining unit, 7: Output control unit, 8: Second route condition acquiring unit, 9: Difficulty level determining unit, 11: Current position information receiving unit, 12: Route information receiving unit, 13: Transmitting unit, 100, 100a, 100b: Information provision device, 200: Information provision server, 300: Vehicle, 301: Onboard device, 400: Mobile terminal, 500: Navigation system, 501: Information acquiring device, 502: Control device, 503: Output device, 504: Input device, 505: Map database, 506: Route calculation device, 507: Route guidance device.

The invention claimed is:

1. An information provision device, comprising:
processing circuitry configured to
  acquire route condition information of a planned travel route of a moving body, the planned travel route including a plurality of sections, each of the plurality of sections representing a distance range from a position of the moving body and including a corresponding complexity level;

define a content of at least one piece of recommended operation information related to a device included in the moving body and a recommended output point in the planned travel route at which the at least one piece of recommended operation information is output;

determine a corresponding complexity level in a section of the plurality of sections including the recommended output point using a static route condition out of the acquired route condition information and, in a case where the corresponding complexity level of the section including the recommended output point is greater than or equal to a threshold value, determine a corresponding complexity level of each of the plurality of sections not including the recommended output point in the planned travel route;

determine another output point for the at least one piece of recommended operation information using the determined corresponding complexity levels for the plurality of sections not including the recommended output point;

acquire current route condition information of a travel route including a current position of the moving body excluding the planned travel route;

determine a difficulty level of operation in the travel route of the moving body using a dynamic route condition out of the acquired current route condition information when the moving body is travelling on the planned travel route toward the another output point; and switch an output method of the content of the at least one piece of recommended operation information at the another output point between a visual format and an audio format based on the determined difficultly level.

2. The information provision device according to claim 1, wherein, in a case where the corresponding complexity level of each of the plurality of sections not including the recommended output point has been determined, the processing circuitry determines the another output point to be in a section closest to the recommended output point out of the plurality of sections the corresponding complexity levels of which have been determined to be less than the threshold value.

3. The information provision device according to claim 1, wherein, in a case where all the corresponding complexity levels of the section including the recommended output point and the plurality of sections are greater than or equal to the threshold value, the processing circuitry determines a corresponding complexity level of the travel route using a static route condition out of the acquired current route condition information; and in a case where the corresponding complexity level of the travel route is less than the threshold value, the processing circuitry changes the content of the at least one piece of recommended operation information and determines the another output point as a point in the travel route.

4. The information provision device according to claim 3, wherein the processing circuitry changes at least one of the content of the at least one piece of recommended operation information, the recommended output point of the at least one piece of recommended operation information, a mode of output of the at least one piece of recommended operation information, an output destination of the at least one piece of recommended operation information, a number of output events of the at least one piece of recommended operation information, and an order of priority of the at least one piece of recommended operation information on a basis of a determination result.

5. The information provision device according to claim 4, wherein the processing circuitry determines the difficulty level of operation in the travel route using also the static route condition out of the acquired route condition information.

6. An information provision server, comprising:
a receiver to receive a current position of a moving body and route information of the moving body;
processing circuitry configured to
acquire route condition information of a planned travel route of the moving body, the planned travel route including a plurality of sections, from the current position of the moving body and the route information of the moving body received by the receiver, each of the plurality of sections representing a distance range from a position of the moving body and including a corresponding complexity level;

define a content of at least one piece of recommended operation information related to a device included in the moving body and a recommended output point in the planned travel route at which the at least one piece of recommended operation information is output;

determine a corresponding complexity level in a section of the sections including the recommended output point by using a static route condition out of the acquired route condition information and, in a case where the corresponding complexity level of the section including the recommended output point is greater than or equal to a threshold value, determine a corresponding complexity level of each of the plurality of sections not including the recommended output point in the planned travel route;

determine another output point for the at least one piece of recommended operation information using the determined corresponding complexity levels for the plurality of sections not including the recommended output point;

acquire current route condition information of a travel route including a current position of the moving body excluding the planned travel route;

determine a difficulty level of operation in the travel route of the moving body using a dynamic route condition out of the acquired current route condition information when the moving body is travelling on the planned travel route toward the another output point; and switch an output method for outputting the at least one piece of recommended operation information at the another output point between a visual format and audio format based on the determined difficultly level; and a transmitter to transmit output control information of an output control.

7. An information provision method, comprising:
acquiring route condition information of a planned travel route of a moving body, the planned travel route including a plurality of sections, each of the plurality of sections representing a distance range from a position of the moving body and including a corresponding complexity level;

defining a content of at least one piece of recommended operation information related to a device included in the moving body and a recommended output point in the planned travel route at which the at least one piece recommended operation information is output;

determining a corresponding complexity level in a section of the sections including the recommended output point by using a static route condition out of the acquired route condition information and, in a case where the corresponding complexity level of the section including the recommended output point is greater than or equal to a threshold value, determining a corresponding complexity level of each of the plurality of sections not including the recommended output point in the planned travel route;

determining another output point for the at least one piece of recommended operation information using the determined corresponding complexity levels for the plurality of sections not including the recommended output point;

acquiring current route condition information of a travel route including a current position of the moving body excluding the planned travel route;

determining a difficulty level of operation in the travel route of the moving body using a dynamic route condition out of the acquired current route condition information when the moving body is travelling on the planned travel route toward the another output point; and switching an output method for outputting the content of the at least one piece of recommended operation information at the another output point between a visual format and an audio format based on the determined difficultly level.

* * * * *